United States Patent [19]

Minowa et al.

[11] Patent Number: 5,752,485
[45] Date of Patent: May 19, 1998

[54] OUTPUT TORQUE CONTROL APPARATUS AND METHOD FOR AN INTERNAL COMBUSTION ENGINE

[75] Inventors: Toshimichi Minowa, Tokai-mura; Mineo Kashiwaya; Naoyuki Ozaki, both of Hitachinaka; Matsuo Amano, Hitachi; Hiroshi Ohnishi, Hitachinaka, all of Japan

[73] Assignee: Hitachi, Ltd., Japan

[21] Appl. No.: 788,565

[22] Filed: Jan. 24, 1997

Related U.S. Application Data

[63] Continuation of Ser. No. 491,245, Jun. 16, 1995, Pat. No. 5,660,157.

[30] Foreign Application Priority Data

Jun. 17, 1994 [JP] Japan .................. 6-135232
Jul. 25, 1994 [JP] Japan .................. 6-172275

[51] Int. Cl.$^6$ ............................................. F02D 7/00
[52] U.S. Cl. ............................................. 123/399
[58] Field of Search .......................... 123/399, 396, 123/342, 361, 586, 352, 403, 406, 415, 416, 421; 73/118.1, 513, 514

[56] References Cited

U.S. PATENT DOCUMENTS

| | | | |
|---|---|---|---|
| 4,730,587 | 3/1988 | Norota et al. | 123/416 |
| 4,745,901 | 5/1988 | Reifenberger et al. | 123/416 |
| 5,156,125 | 10/1992 | Fukui et al. | 123/414 |
| 5,168,851 | 12/1992 | Itoyama et al. | 123/399 |
| 5,172,670 | 12/1992 | Nemoto | 123/416 |
| 5,297,048 | 3/1994 | Gauer | 364/431.12 |
| 5,383,432 | 1/1995 | Cullen et al. | 123/406 |
| 5,447,134 | 9/1995 | Yokoyama | 123/399 |
| 5,473,544 | 12/1995 | Yamashita | 364/426.03 |
| 5,566,656 | 10/1996 | Buchl | 123/399 |
| 5,606,951 | 3/1997 | Southern et al. | 123/399 |
| 5,611,309 | 3/1997 | Kumagai et al. | 123/399 |
| 5,619,967 | 4/1997 | Streib | 123/399 |
| 5,622,151 | 4/1997 | Lang | 123/339.15 |

*Primary Examiner*—Raymond A. Nelli

[57] ABSTRACT

The invention provides an output torque control method and apparatus for a lean burn internal combustion engine which accounts for aging of component parts, and in which no stepwise change of torque or shock occur when an air fuel ratio is changed. The method and apparatus according to the invention control an intake air amount while maintaining an emission purification function by controlling the air fuel ratio to that of a theoretical mixture (air fuel ratio of 14.7) in a case where a limit NOx emission is determined by using a detected air fuel ratio and lean burn operation becomes difficult due to the amount of NOx emissions. Abrupt change of an output torque when the air fuel ratio is changed is curtailed by controlling a fuel amount or an air amount after calculating the fuel amount or the air amount from an engine speed and an accelerator depression angle.

8 Claims, 24 Drawing Sheets

OUTPUT TORQUE CONTROL APPARATUS AND METHOD FOR AN INTERNAL COMBUSTION ENGINE

This is a continuation of application Ser. No. 08/491,245, filed Jun. 16, 1995, now U.S. Pat. No. 5,660,157.

FIELD OF THE INVENTION

The present invention relates to a method and apparatus for controlling the output torque of an automotive internal combustion engine, especially a lean burn internal combustion engine.

BACKGROUND OF THE INVENTION

A lean burn internal combustion engine is an internal combustion engine in which an air fuel ratio—the ratio of the quantity of intake air (intake amount) to the quantity of fuel—is larger than a theoretical (stoichiometric) air fuel ratio; that is, it is operated at a lean air fuel ratio wherein the intake amount is larger than the fuel amount. In controlling a conventional lean burn internal combustion engine, for example, as described in Japanese Unexamined Patent Publication No. 34329/1976, a method has been proposed in which fuel consumption is improved by controlling the air fuel ratio in accordance with periodic variation of average pressure in a combustion chamber, and increasing an operating region of lean burn. Further, Japanese Unexamined Patent Publication No. 160530/1983, discloses a method in which exhaust gas recirculation, ignition timing and air fuel ratio are controlled in accordance with a variation in torque, which is calculated by combustion pressure and the like.

However, in increasing the operating region of lean burn to improve fuel cost, the objective of reducing a poisonous component of exhaust gas (emission of a nitrogen oxide component, hereinafter referred to as NOx), is not considered; and therefore, the control of a lean burn internal combustion engine is incomplete. Further, the reduction of poisonous components in exhaust gas and the operational performance deteriorate over time in comparison with their initial states, due to aging of component parts of the lean burn internal combustion engine and component parts of a control device.

In addition, the lean burn air fuel ratio is switched to the theoretical air fuel ratio when large power output is required since the output is insufficient in the lean burn state in comparison with the combustion state at the theoretical air fuel ratio. However, in switching the air fuel ratio, the fuel amount is changed while the intake amount remains constant, and therefore the output torque is abruptly changed, adversely affecting handling of the vehicle.

SUMMARY OF THE INVENTION

It is an object of the present invention to provide a method and apparatus for controlling output torque of a lean burn internal combustion engine which takes into account the above-mentioned aging, does not increase the fuel cost, furthers the objective of reducing poisonous components of exhaust gas, and improves the operational performance, without causing an abrupt change of torque, even when the air fuel ratio is changed.

To achieve the above object, the present invention includes a target air fuel ratio data calculating unit which calculates target air fuel ratio data for a lean burn internal combustion engine based on the intake amount, the depression angle of an accelerator pedal and rotational velocity of the engine; a torque detecting device for detecting an output torque showing an operational state of the engine; a lean burn limit determining unit for determining a limit region of lean burn in accordance with change of the output torque; air fuel ratio detecting device for detecting the air fuel ratio; a NOx emission amount/limit air fuel ratio determining unit for determining a limit air fuel ratio corresponding to a predetermined limit for NOx emissions by using the air fuel ratio; an air fuel ratio correcting unit for outputting a corrected air fuel ratio value corresponding to a lean burn limit which has been determined by the above-mentioned lean burn limit determining unit; a target air fuel ratio data changing device for rewriting and changing a target air fuel ratio data in accordance with the corrected air fuel ratio from the air fuel ratio correcting unit and the corrected air fuel ratio from the NOx emissions amount limit air fuel ratio determining unit; a target air fuel ratio data storage unit for storing the target air fuel ratio data used for calculating the fuel amount; a fuel amount calculating unit for calculating the fuel amount using the target air fuel ratio data and the corrected air fuel ratio; and a fuel injection valve for supplying the lean burn internal combustion engine with the fuel amount which has been calculated by the fuel amount calculating means.

By means of the above-mentioned construction, a NOx emission limit is determined based on the air fuel ratio obtained from the air fuel ratio detecting unit, and the air fuel ratio is adjusted to the theoretical mixture (air fuel ratio= 14.7) when the lean burn operation becomes difficult in view of the NOx emission amount, to thereby maintain the emission control function. Further, the output torque of the internal combustion engine can be prevented from changing by adding a torque correction which controls the air intake so as to adapt to the air fuel ratio control. In this arrangement, improvement of fuel cost by the lean burn limit control and maintaining the emission control function by determining the limit NOx emission limit are compatible with each other.

Another embodiment of the present invention includes a steady state (normal) fuel amount calculating device for calculating the fuel amount based on the engine speed and an accelerator depression angle with the engine operated at lean burn or at the theoretical air fuel ratio; and a device for calculating an adjusted fuel amount to avoid abrupt (stepwise) torque change or shock when the air fuel ratio is switched, based on the engine speed and the accelerator depression angle, when the state of the engine is switched from either one of the above two combustion states to the other combustion state.

Further, still another embodiment of the present invention includes the steady state intake amount calculating unit for calculating the intake amount based on the engine speed and the accelerator depression angle with the engine operated at lean burn or at the theoretical air fuel ratio; and a device for calculating an adjusted air amount to avoid abrupt torque change when the air fuel ratio is switched, based on the engine speed and the accelerator depression angle when the engine is switched from either one of the above two combustion states to the other combustion state.

With the above construction, the engine is controlled such that the fuel amount or the intake amount is changed in switching the air fuel ratio so that an abrupt torque change, and therefore, advance vehicle handling effects caused by such an abrupt change, can be alleviated.

Other objects, advantages and novel features of the present invention will become apparent from the following

3 detailed description of the invention when considered in conjunction with the accompanying drawings.

DETAILED DESCRIPTION OF THE PREFERRED EMBODIMENTS

Figure 1:
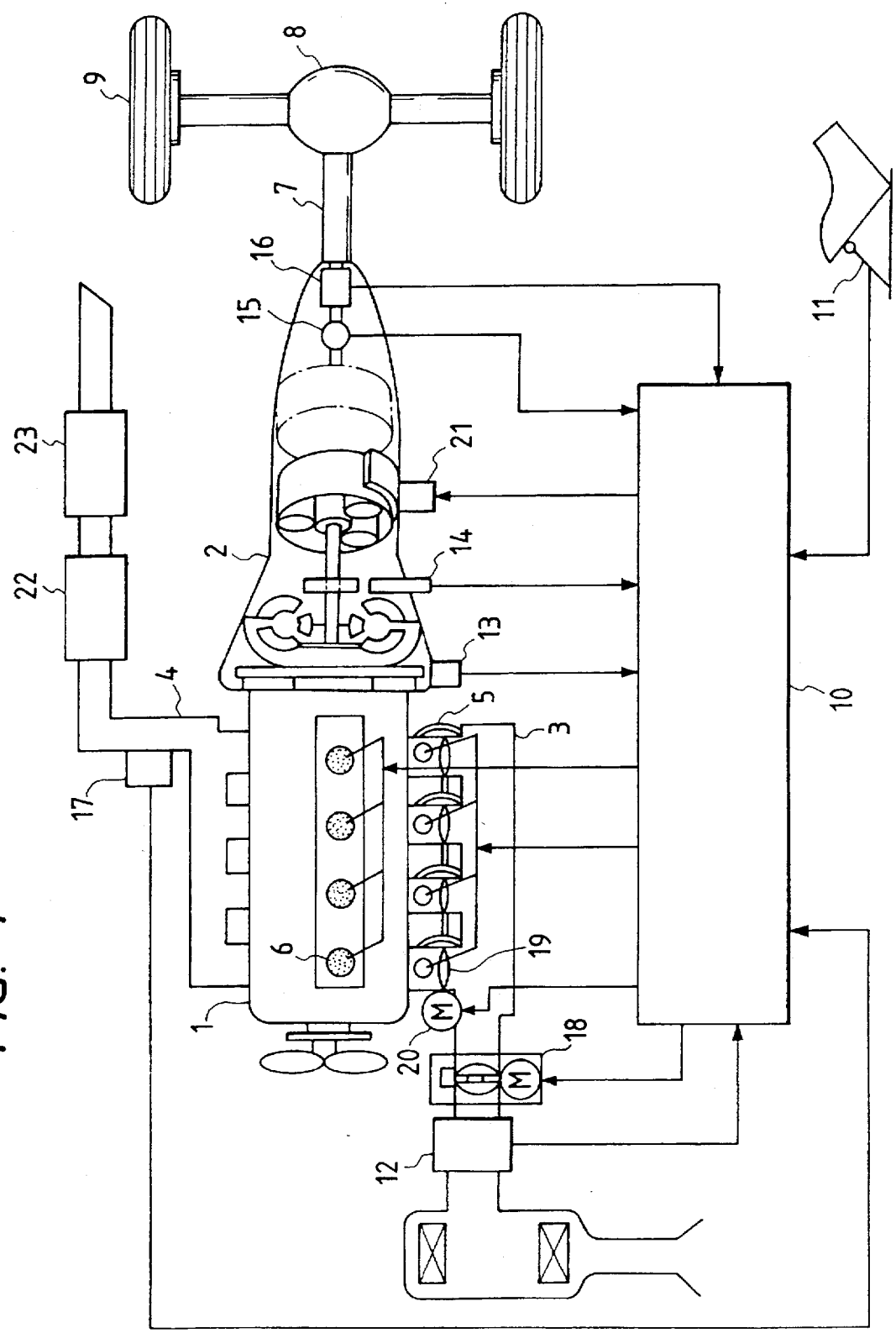
FIG. 1 is a schematic depiction of an automobile power train system.

A first embodiment of the present invention is shown in FIGS. 1 through 7. FIG. 1 is a schematic view of an automotive drive train. Attached to an engine 1 are a change gear 2, an intake pipe 3, an exhaust pipe 4, fuel injection valves 5 and ignition plugs 6. Intake air flowing into the engine after passing through the intake pipe 3 and fuel injected from the fuel injection valves 5 are mixed into a mixture which is ignited and combusted by the ignition plugs 6 and a change of pressure in the combustion is converted into an output in the form of a rotational motion. The change gear 2 reduces the speed of the rotational motion and transmits it to a drive shaft 7 of an automobile. The rotational motion of the drive shaft 7 is transmitted to wheels 9 via a differential gear 8 whereby the automobile can run on roads. The engine 1 and the change gear 2 are electrically connected to a control unit 10 and signals are sent and received therebetween. Input signals to the control unit 10 are sent from an accelerator depression angle sensor 11, an air flow (intake amount) sensor 12, an input shaft rotation sensor 13 attached to an input shaft of a torque converter in the change gear 2 for measuring an engine speed, an output shaft rotation sensor 14 attached to an output shaft of the torque converter, an output shaft rotation sensor 15 attached to an output shaft of the change gear 2 connected to the driver shaft 7, a torque sensor 16 and an oxygen sensor 17 attached to the exhaust pipe 4. Output signals are sent from the control unit 10 to a throttle control device 18 for adjusting intake air amount in the intake pipe 3, a drive motor 20 for driving swirl shunt valves 19 each generating a swirl flow in the intake air to accelerate combustion, the fuel injection valves 5, the ignition plugs 6 and a speed change controlling actuator 21 each of which is controlled by each of the output signals. The oxygen sensor 17 can determine the air fuel ratio by measuring oxygen concentration in the exhaust gas and therefore, it can be used as an air fuel ratio sensor. Further, a three way catalyst 22 and a NOx reduction catalyst 23 are installed to the exhaust gas 4 to purify the exhaust gas.

Figure 2:
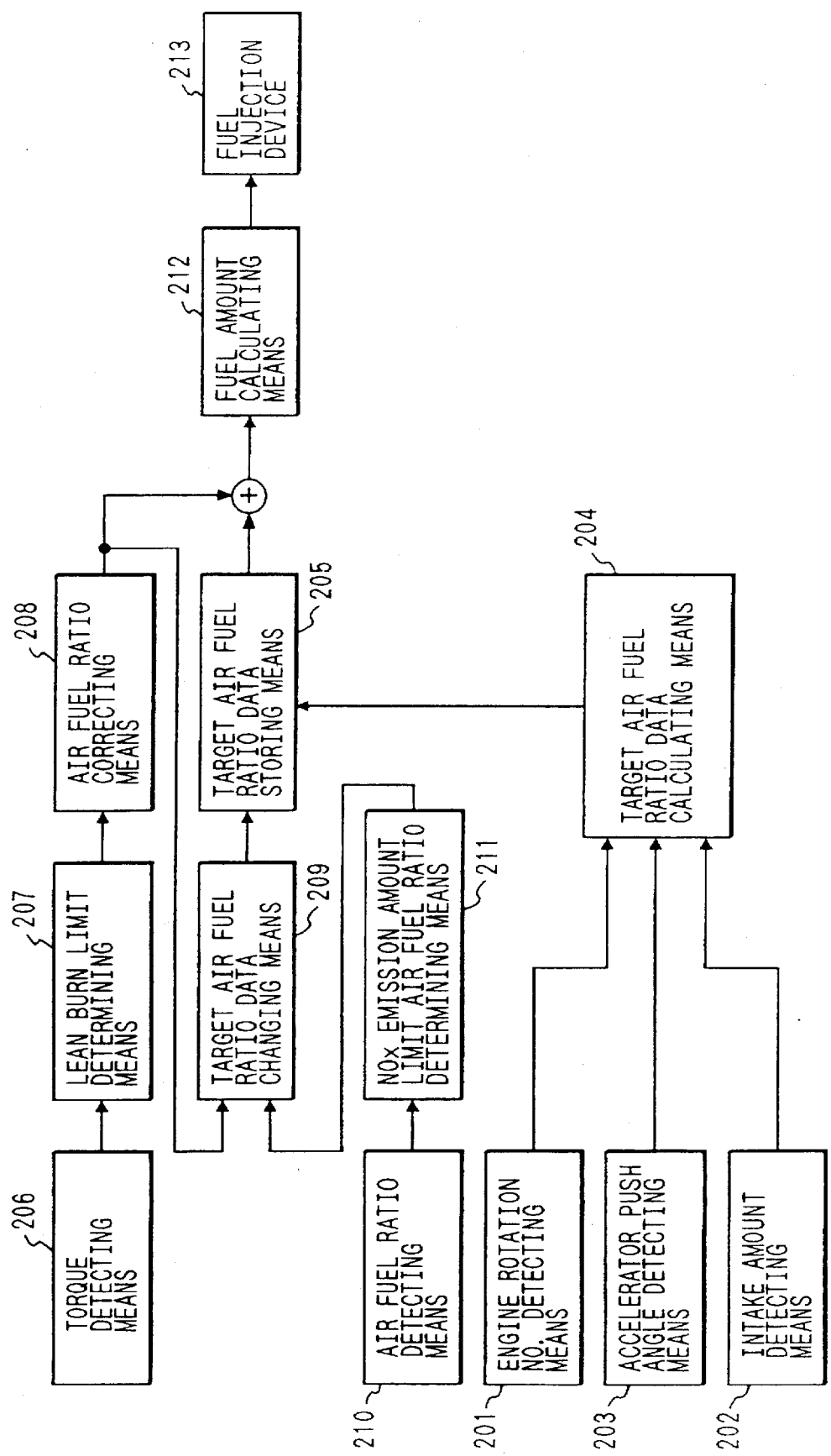
FIG. 2 is block diagram showing the manner of controlling an output torque of an engine.

FIG. 2 is a block diagram showing an arrangement for controlling an output torque of the engine 1 according to the invention. A target air fuel ratio data calculating unit 204 calculates a target air fuel ratio from data sent from an engine speed sensor 201, an intake air amount sensor 202 and an accelerator depression angle sensor 203, and sends it to a target air fuel ratio data storing unit 205. Meanwhile, a torque detecting unit 206 detects a torque value indicative of the operational state of the engine 1; a lean burn limit determining unit 207 determines a limit of lean burn while detecting a change of the torque; an air fuel ratio correcting unit 208 calculates a corrected value of the air fuel ratio corresponding to the determined limit of lean burn and sends it to a target air fuel ratio data changing unit 209. Further, a NOx emission amount limit air fuel ratio determining means 211 determines a limit air fuel ratio having lower NOx emissions based on the air fuel ratio detected by an air fuel ratio detecting unit 210, and sends the corrected value of the air fuel ratio corresponding thereto to the target air fuel ratio data changing unit 209. The target air fuel ratio data changing unit 209 rewrites and changes the target air fuel ratio data stored in the target air fuel ratio data storing unit 205 in accordance with the corrected value of the air fuel ratio from the air fuel ratio correcting unit 208 and the limit air fuel ratio determining unit 211. Next, the rewritten target air fuel ratio data is again corrected by the correction value from the air fuel ratio correcting unit 208 and sent to a fuel amount calculating means 212. The fuel amount calculating means 212 calculates a fuel amount based on the sent target air fuel ratio data, and sends the data of the fuel amount to a fuel injection device 213 whereby the fuel amount in accordance with the value of the calculated target air fuel ratio data is supplied to the engine 1. In this way, the actual lean burn limit air fuel ratio is compared with the NOx emission limit air fuel ratio and the target air fuel ratio is set based on the determination. Therefore, it is possible to attain air fuel ratio control capable of coping with aging of mechanical devices or the like and the fuel cost reduction and the exhaust gas purification can be compatible with each other.

Figure 3:
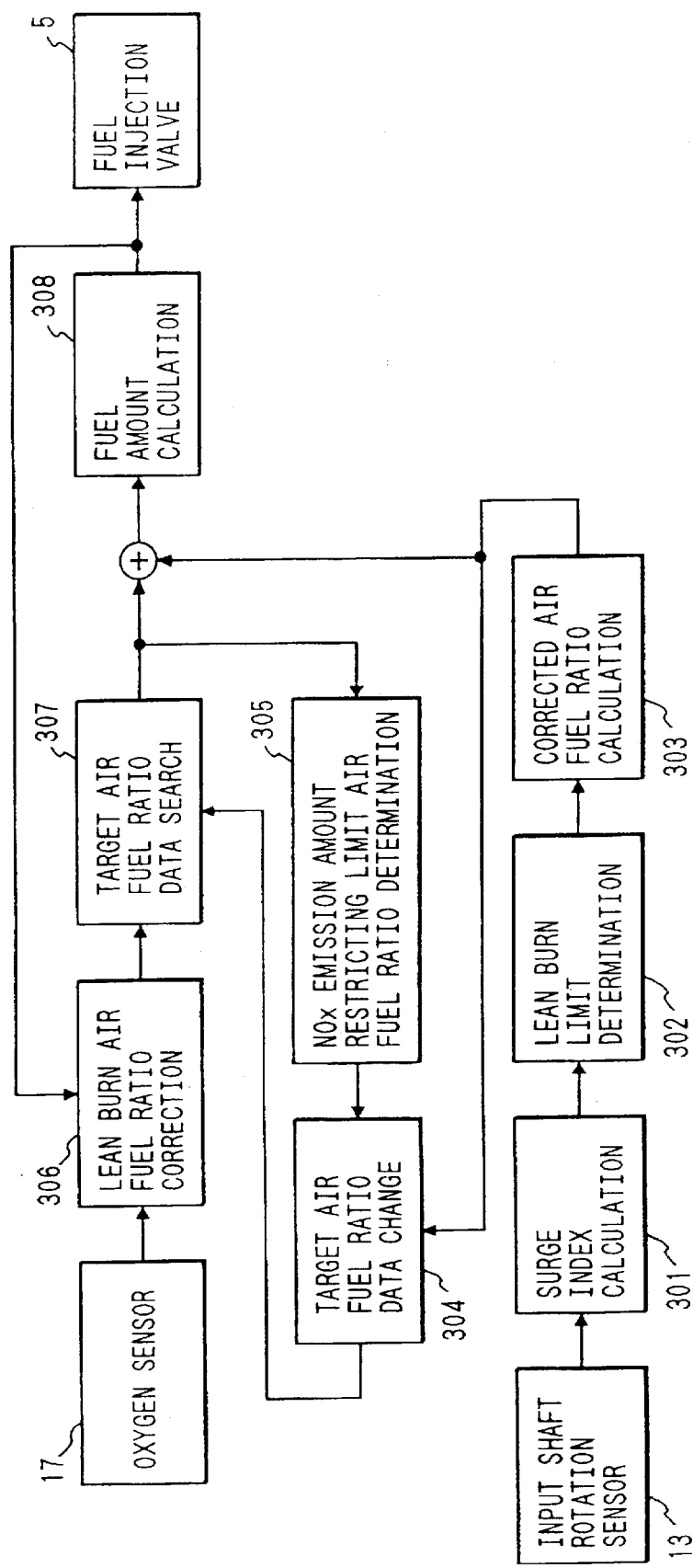
FIG. 3 is a block diagram showing a specific embodiment for controlling an output torque of an engine.

FIG. 3 is a block diagram showing a specific arrangement for controlling an output torque of an engine. Existing sensors are used here in view of their cost and mounting performance. Torque variation in the vicinity of a lean burn limit is detected by calculating a surge index based on the rate of change of the engine speed in block 301 and determining the lean burn limit in block 302. Next, a corrected air fuel ratio is calculated in block 303, based on the lean burn limit determined in block 302. Concurrently, the operation detects the oxygen amount very accurately, using the oxygen sensor 17 by which the air fuel ratio is predicted. That is, in block 306 the operation determines the target air fuel ratio data when the target air fuel ratio becomes the theoretical air fuel ratio (air/fuel=14.7) and corrects the air fuel ratio in lean burn by the result of learning the theoretical air fuel ratio. In block 307, the operation reads the target air fuel ratio data from the target air fuel ratio data storing means 205 shown in FIG. 2, calculates the fuel amount and outputs the data to the fuel injection valve 5 in block 308. In this case, the operation adds the corrected air fuel ratio calculated in block 303 to the target air fuel ratio read in block 307 to thereby correct the target air fuel ratio. Also, the operation determines whether or not the target air fuel ratio data read in block 307 is equal to the NOx emission limit air fuel ratio in block 305. If it is, in block 304 the operation changes the target air fuel ratio data read in block 307 by the corrected air fuel ratio sent from block 303.

Figure 4:
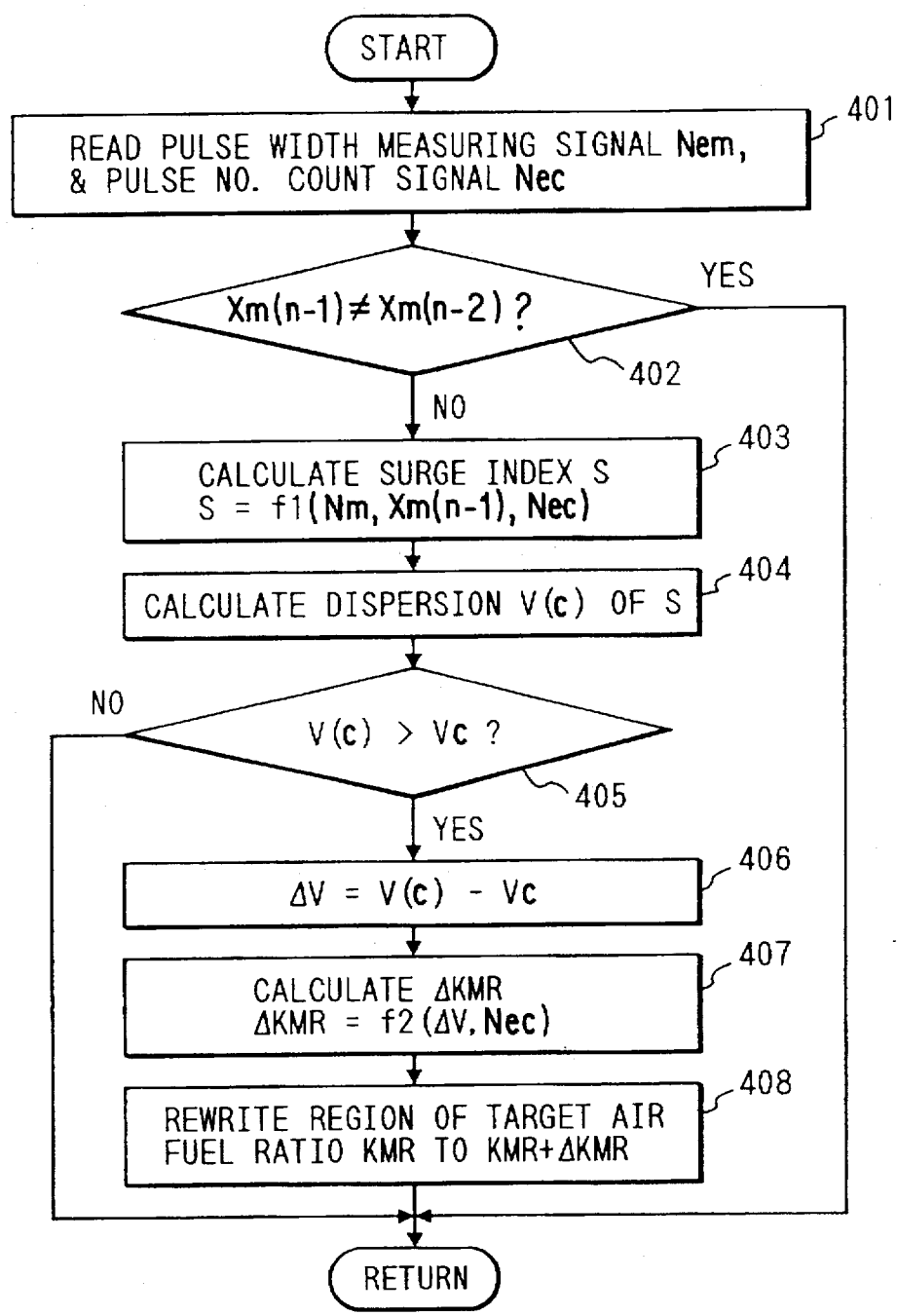
FIG. 4 is a flow chart which shows the process performed by the control in FIG. 3.
Figure 5:
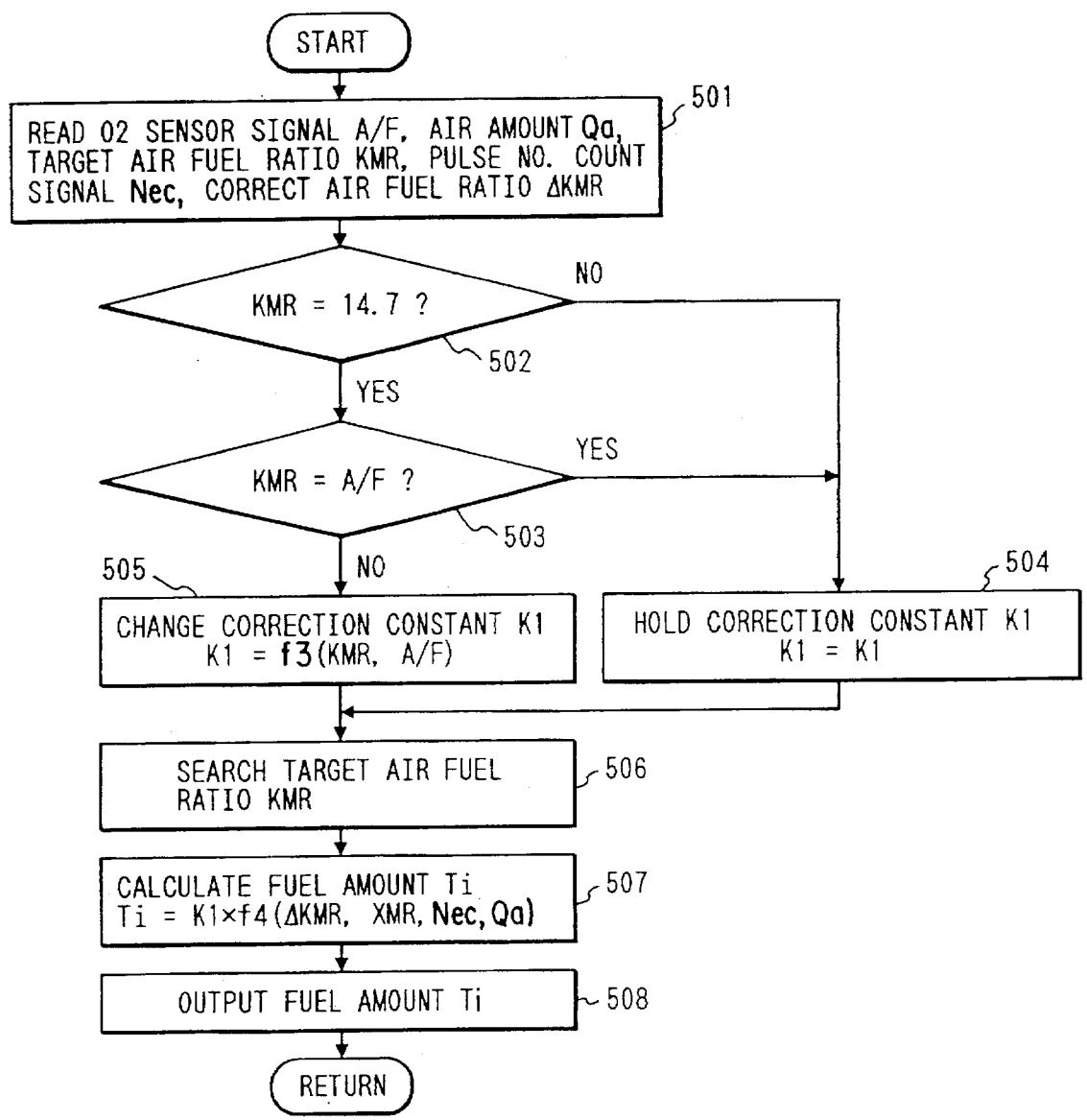
FIG. 5 is a flow chart which shows the process performed by the control in FIG. 3.
Figure 6:
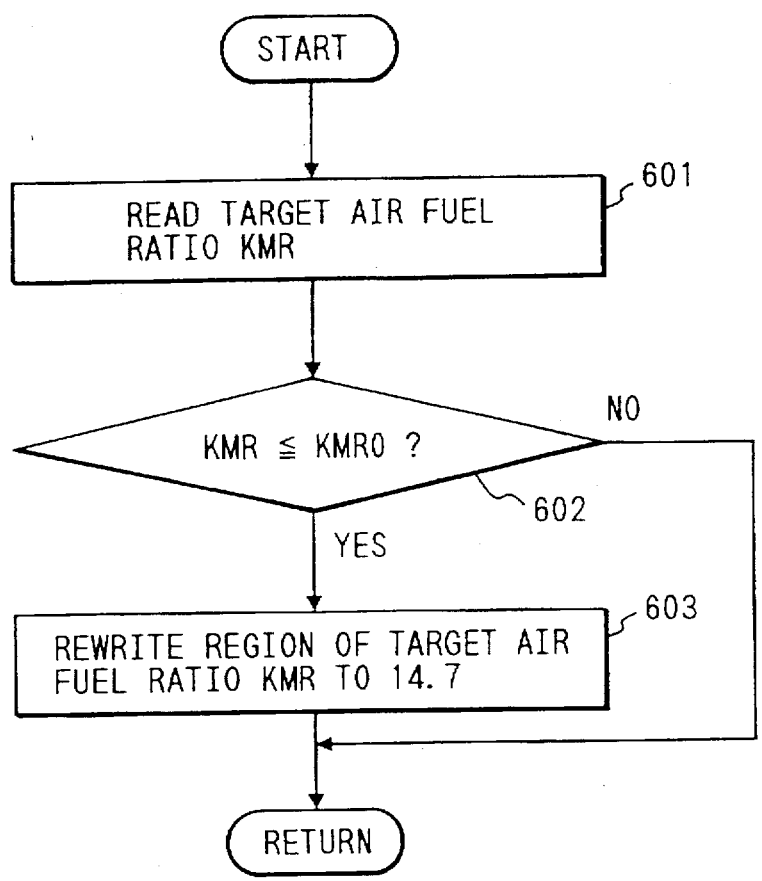
FIG. 6 is a flow chart which shows the process performed by the control in FIG. 3.

FIGS. 4 through 6 are flow charts which illustrate the operation of the control arrangement shown in FIG. 3. FIG. 4 shows the operation of blocks 301 through 304 in FIG. 3. Firstly, in step 401 the operation reads signals Nem and Nec from two systems of pulse width measuring and pulse number counting, to accurately detect the engine speed. Next, in step 402, the operation determines whether the engine is presently operating in a steady state, by comparing consecutive engine speed measurements. Xm(n−1) and Xm(n−2) respectively designate the pulse width measuring signals averaged by the pulse number count value of the preceding measurement, and measurement before that. When Xm(n−1) and Xm(n−2) differ, the operation proceeds to RETURN; when they are equal, the process advances to step 403. Instep 403 the operation calculates a surge index S indicative of torque variation, as a function f1 of Nem, Nec and Xm(n−1). Further, in step 404 a dispersion V(c) of the surge index S is calculated. This V(c) corresponds to the torque.

In step 405 it is determined whether the dispersion V(c) is larger than a predetermined torque variation limit value VL. When V(c)≦VL, it is determined that there is no abrupt torque variation, and processing RETURNS to the start.

When V(c)>VL, it is deemed that there is an abrupt torque variation, and in step 406 a difference Δ V between V(c) and VL is calculated. Further, in step 407 the operation calculates a corrected air fuel ratio Δ KMR as a function f2 of Δ V and Nec, rewrites the data of the target air fuel ratio KMR to KMR+Δ KMR in step 408, and proceeds to RETURN.

FIG. 5 shows the process performed by blocks 306 to 308 in FIG. 3. First, in step 501 the operation reads output signals from an oxygen sensor A/F, an air flow sensor Qa, the above-mentioned KMR and Nec. Next, in step 502, it is determined whether KMR is 14.7 (theoretical air fuel ratio). For this purpose, it is necessary to determine with high accuracy the actual air fuel ratio in the lean burn region by the oxygen sensor. Therefore, the operation corrects the target air fuel ratio data when the air fuel ratio is 14.7, which can be detected by the oxygen sensor. When the determination is Yes in step 502, it is determined to step 503 whether the target air fuel ratio KMR is equal to the actual air fuel ratio A/F. If so, the operation proceeds to step 504 and holds a correction constant k1 at the previous calculation. When they are not equal, the operation proceeds to step 505 and calculates the correction constat k1 from a function f3 of KMR and A/F, to correct it. In step 506 the data table of the target air fuel ratio KMR is searched. Next, in step 507 the operation calculates a fuel amount Ti by multiplying a function f4 of Δ KMR, KMR, Nec and Qa by k1, and outputs it in step 508. When the determination is No in step 502 (that is, the air fuel ratio is not 14.7), the operation proceeds to step 504 because the air fuel ratio cannot be corrected.

FIG. 6 is a flow chart which shows the operation of blocks 304 and 305 in FIG. 3. First, the air fuel ratio KMR is read in step 601. Then, in step 602 it is determined whether the target air fuel ratio KMR is equal to or less than a NOx emission limit air fuel ratio KMRO, which is previously set as, for example, 22. When the determination is No, the operation proceeds to RETURN. When it is Yes, in step 603 the data table of the target air fuel ratio KMR is rewritten to 14.7, to prevent an increase in the emission amount of NOx.

Figure 7:
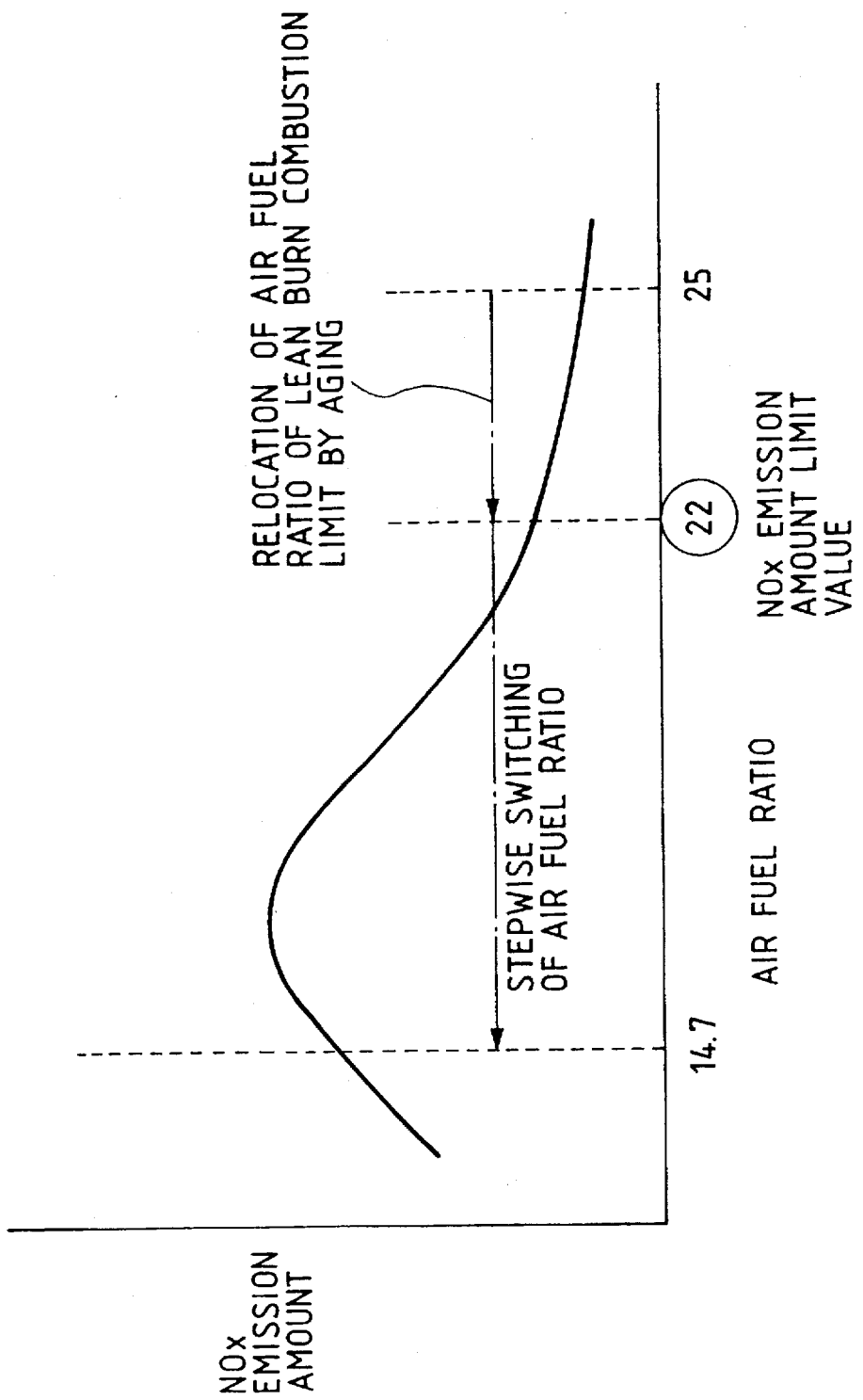
FIG. 7 depicts an operating characteristic which represents the relationship between an air fuel ratio and a NOx emission amount.

FIG. 7 is an operational characteristic which shows the relationship between the air fuel ratio and the amount of NOx emission in the control according to the first embodiment of the present invention. For example, suppose that the air fuel ratio of a lean burn engine is set to 25 when it is new. Thereafter, the lean burn limit air fuel ratio is gradually reduced to less than 25 by aging. As shown in FIG. 7, the farther the air fuel ratio falls below 25, the more the NOx emissions increase. Therefore, the air fuel ratio reaches 22, it is step wisely changed to the theoretical air fuel ratio of 14.7, to prevent the amount of NOx from the increasing. In this manner, fuel cost reduction and exhaust gas purification can be compatible with each other.

Figure 8:
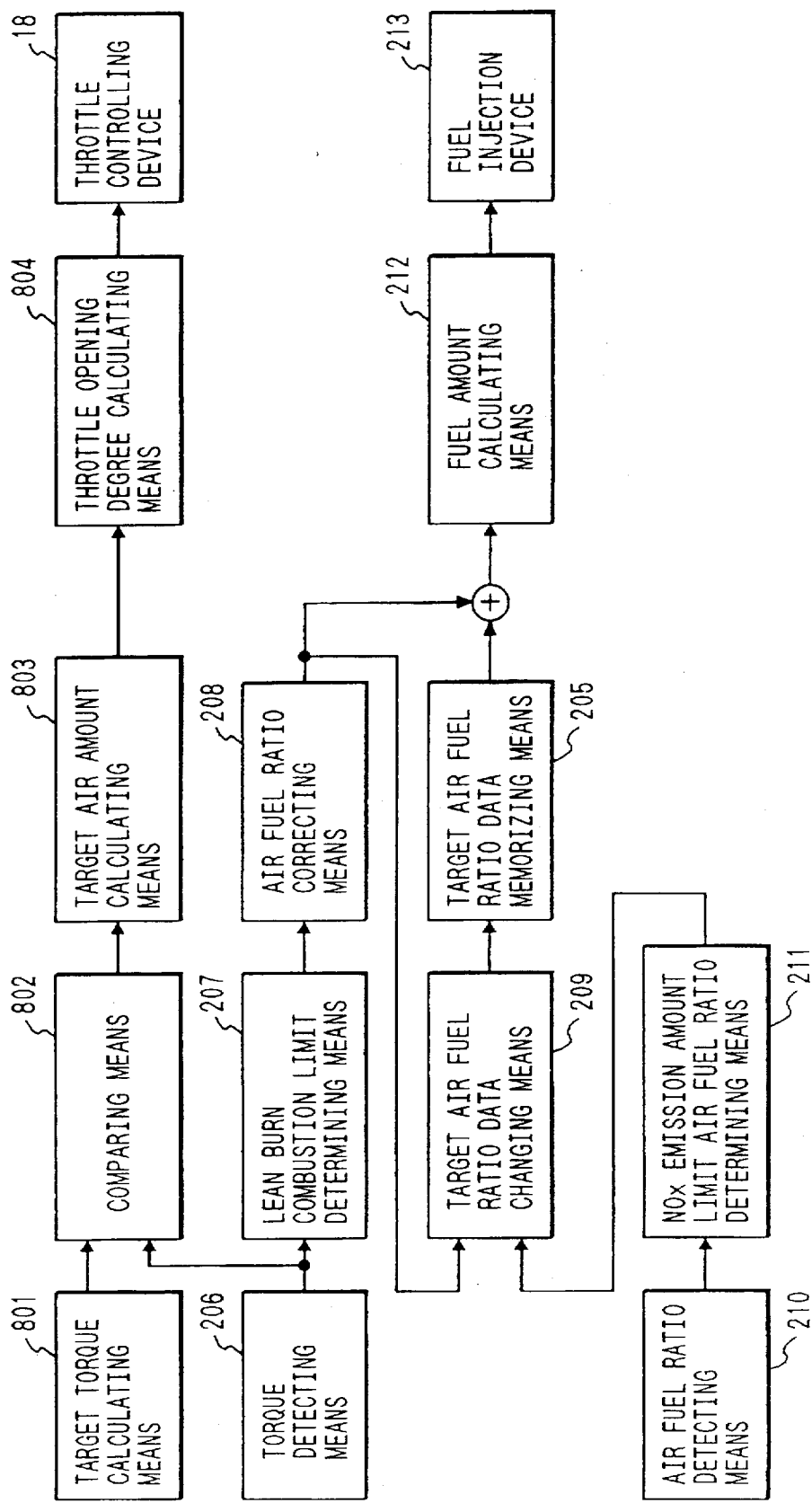
FIG. 8 is a block diagram showing a control arrangement which includes control of the air amount.
Figure 9:
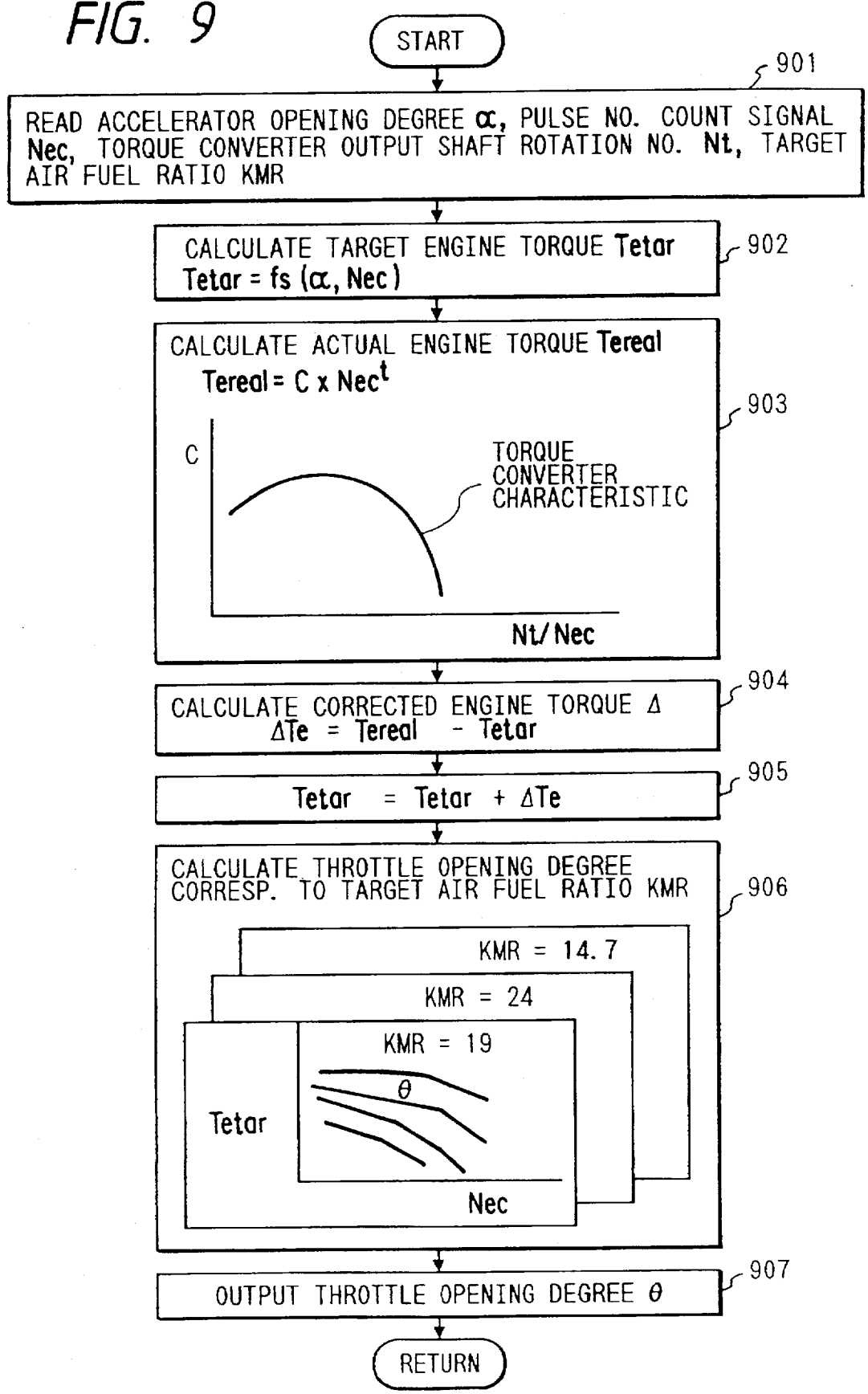
FIG. 9 is a flow chart which shows the process performed by the control in FIG. 8.
Figure 10:
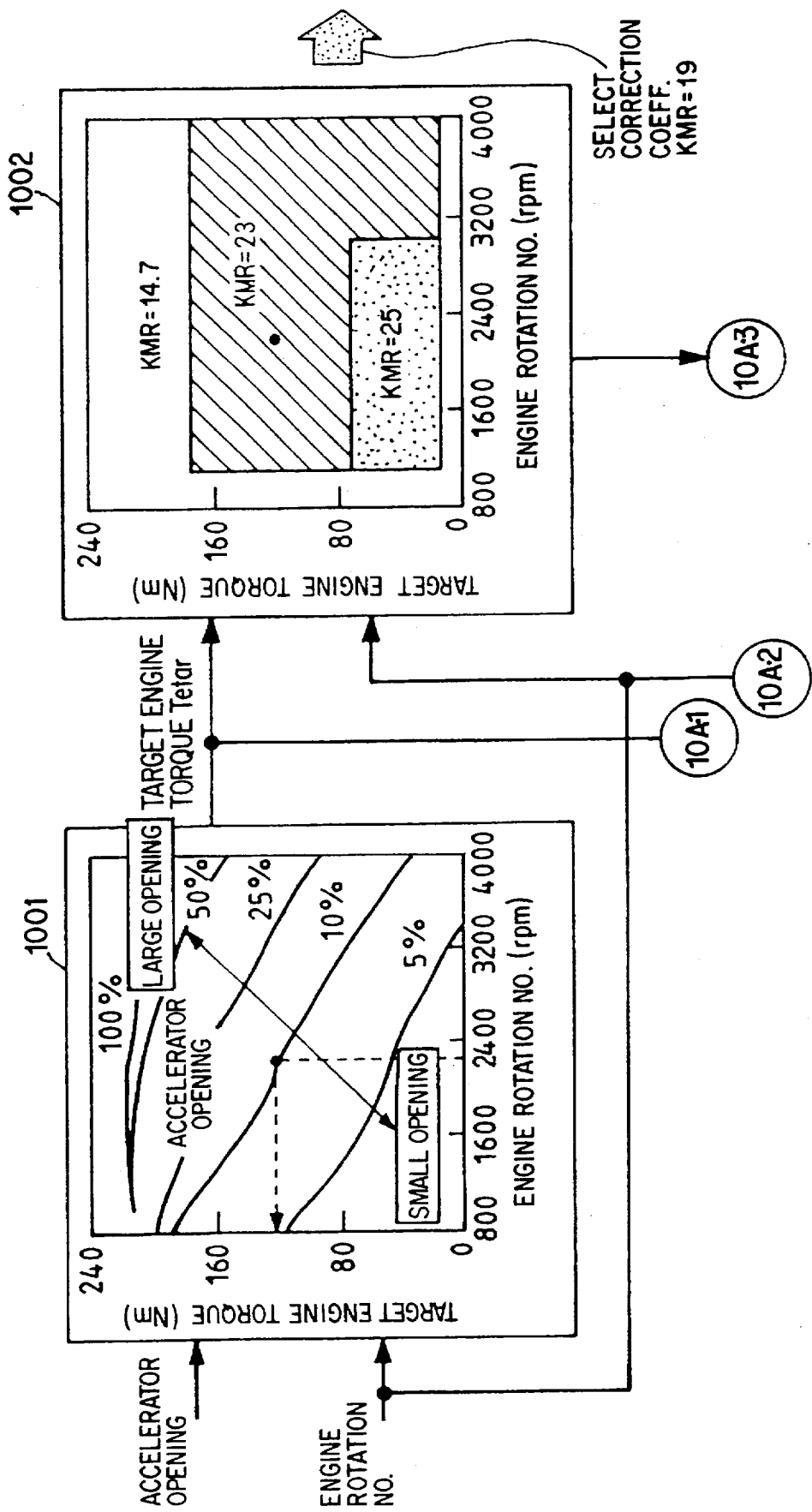
FIGS. 10 and 10A show a conceptual view of a control arrangement which shows maps of basic control of a lean burn internal combustion engine.

FIGS. 8 through 10 show a second embodiment of the present invention in which control of air intake is added to the control of the first embodiment shown in FIG. 2. Portions the same as those in FIG. 2 are attached with the same notations. In the method which controls only the fuel intake as shown in the first embodiment, torque variation due to the change of the air fuel ratio cannot be completely eliminated; therefore, control of air intake is indispensable. First, a target torque calculating unit 801 calculates a target torque required by a driver. The target torque and the actual torque detected by the torque detecting units 206 are compared in a comparing unit 802 and a deviation detected therebetween is used to calculate a target air amount in a target air amount calculating unit 803. A throttle opening degree calculating unit 804 calculates a target throttle opening degree and outputs control data to the throttle controlling device 18, which may be, for example, an electronic control throttle valve in which the throttle valve is opened and closed by driving a motor, an idling speed controlling device, a supercharger and a variable valve timing controlling device etc.

FIG. 9 is a flow chart which shows the operation of the control shown in FIG. 8. First, the operation reads an accelerator opening degree α, the pulse number count signal Nec, speed Nt of the output shaft of the torque converter and the target air fuel ratio KMR. In step 902 a target engine torque Tetar required by a driver is calculated as a function f5 of α and Nec. Next, processing proceeds to step 903 and calculates an actual engine torque Tereal from the characteristic of the torque converter, by multiplying square of Nec by a pump capacity coefficient c that is a function of Nt and Nec. Further, in step 904 a corrected engine torque Δ Te is calculated using the results in steps 902 and 903, and the target engine torque Tetar is corrected in step 905. In step 906 the process searches data tables of Tetar and Nec for every target air fuel ratio KMR and calculates a target throttle opening degree. Finally, the operation outputs the throttle opening degree in step 907.

Although the operation has used data tables to calculate the throttle opening degree, the calculation may of course be performed by forming a model constructed by equations in place of the data tables. Further, for detection of the actual engine torque, it is also possible to use an actual torque sensor attached to the drive shaft, a combustion pressure sensor directly detecting the pressure in cylinders of internal combustion engine, and rotation sensors detecting a difference in rotation (torsion) attached to the front and the end of the drive shaft.

Figure 10A:
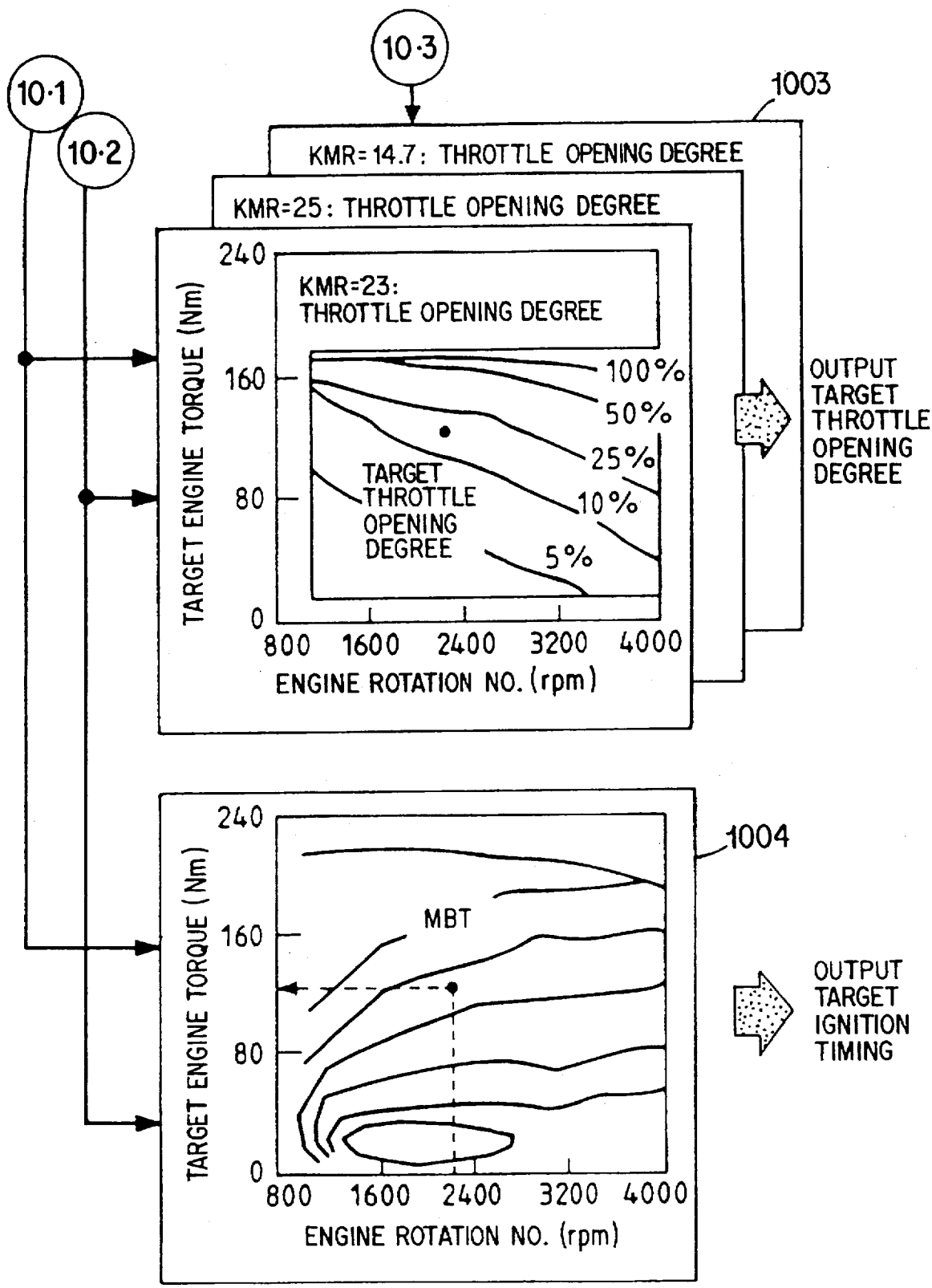

FIGS. 10 through 13 show a third embodiment of the present invention. FIGS. 10 and 10A show a conceptual block diagram showing maps of a basic control of a lean burn internal combustion engine, in which control or ignition timing is added to the above embodiments. In this system the target engine torque of an internal combustion engine is used as a reference. Map 1001, is a family of characteristics of engine torque and the engine speed for various throttle openings, at an air fuel ratio of 14.7. When these characteristics are used as the target, the operating characteristic of a conventional internal combustion engine (not a lean burn type) can be satisfied. Here, the accelerator opening degree (in place of the throttle opening degree) and the engine speed are entered as inputs. (In the example, an engine speed of about 2200 rpm and an accelerator opening of 10% are shown.) To satisfy the torque required by a driver the actual engine torque is conformed to the target engine torque which is outputted.

The fuel amount, the air amount and the ignition timing are determined based on the target engine torque and the engine speed. First, with regard to the fuel amount, there may be a case where misfire is caused depending on the operating region, (for example, in lean mixture) and there may be a case where the mixture cannot be made lean considering the output at high rotation and high load of the engine. Accordingly, the regions of the air fuel ratio are classified as shown in a map 1002. (In the example of FIG. 10, here, the air fuel ratio of 23 is selected.)

Next, in a map 1003 the air fuel ratio (23), the target engine torque and the engine speed are used as inputs to select a target throttle opening degree, which is outputted. Finally, in a map 1004 the target ignition timing selected and outputted, based on the target engine torque and the engine speed. A value of MBT (Minimum Advance of the Best Torque) is set to the ignition timing.

Figure 11:
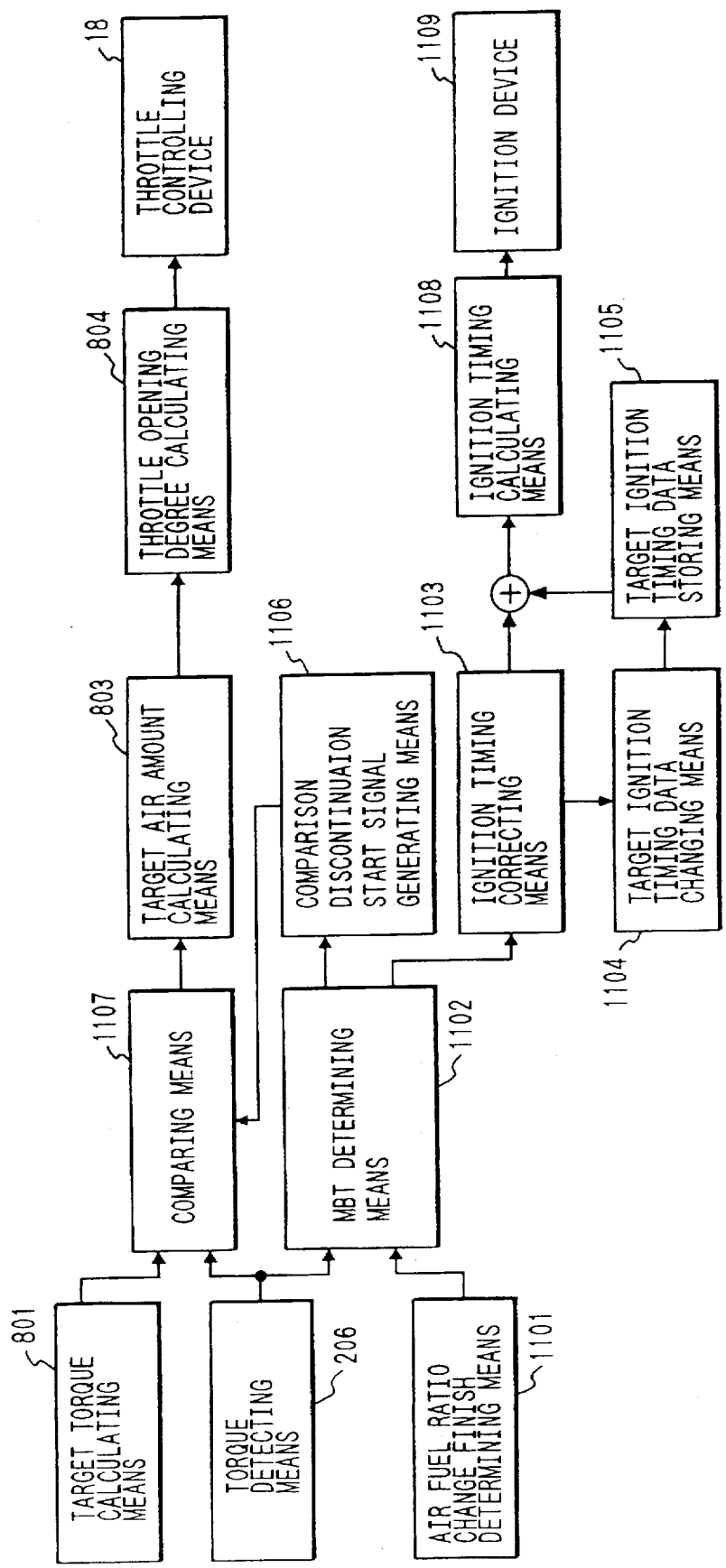
FIG. 11 is a block diagram showing a control arrangement which includes control of ignition timing.

FIG. 11 is a block diagram of a torque control arrangement according to the invention which includes control of ignition. In this embodiment, a signal of an air fuel ratio data change finish determining unit 1101 (for determining whether the change of the air fuel ratio data has been completed) and a signal of the torque detecting unit 206 (for detecting the state of the torque of the output shaft) are inputted to an MBT determining unit 1102. The MBT determining unit 1102 detects the state of torque for controlling the ignition timing (as explained hereinbelow) by which the MBT is determined. An ignition timing correcting unit 1103 corrects the ignition timing in accordance with the state of torque determined by the MBT determining unit 1102, and a target ignition timing data changing unit 1104 changes the value stored in a target ignition timing data storing unit 1105 in accordance with the result of correction.

A comparison interrupt signal generating unit 1106 sends a comparison interrupt signal to a comparing unit 1107, so that the throttle opening degree is not changed, during calculation of the ignition timing MBT. An ignition timing calculating unit 1108 then calculates the ignition timing using data from the ignition timing correcting unit 1103 and the target ignition timing data storage unit 1105 and outputs it to an ignition device 1109 such as the ignition plug 6 shown in FIG. 1. When the MBT determining unit 1102 determines that the ignition timing corresponds to the value for the MBT, comparison interruption signal generating unit 1106 outputs a signal to the comparing unit 1107 to commence comparison, and allows throttle control. The throttle control in correspondence with the torque change due to the ignition timing control is similar to the content described in FIG. 8.

Figure 12:
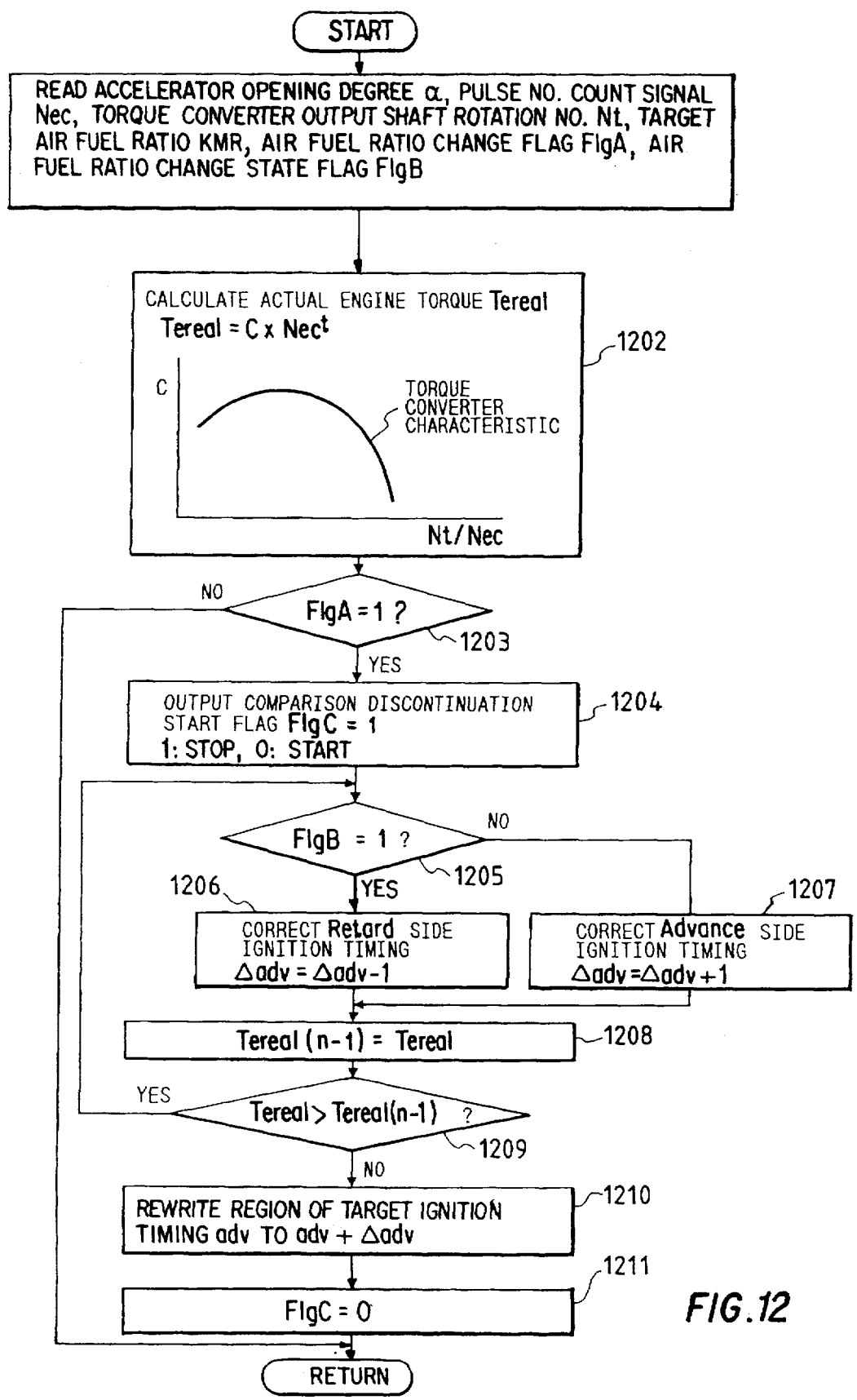
FIG. 12 is a flow chart which shows the process performed by the control in FIG. 11.
Figure 13:
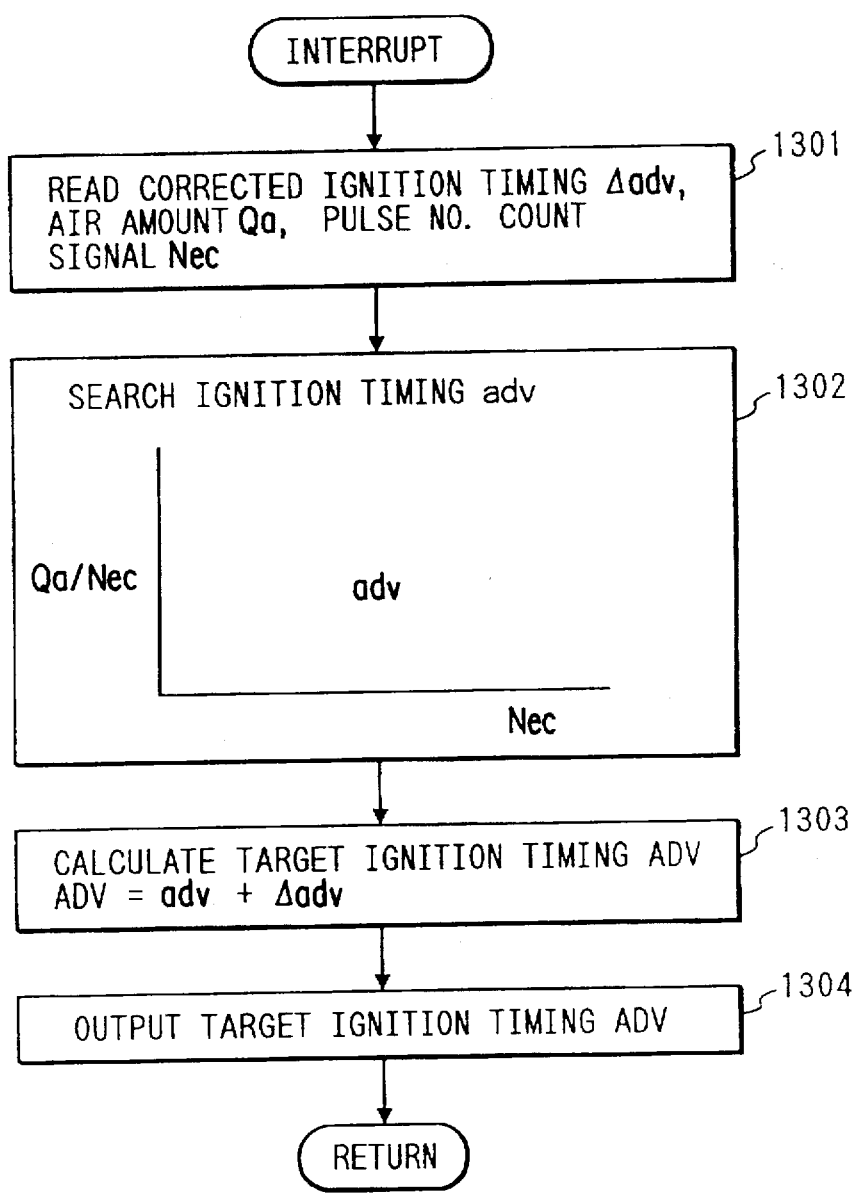
FIG. 13 is another flow chart which shows the process performed by the control in FIG. 11.

FIGS. 12 and 13 are flow charts which show the operation of the control arrangement shown in FIG. 11. In FIG. 12, first, in step 1201, the operation reads the accelerator opening degree a, the pulse number count (engine speed) signal Nec, the torque converter output shaft speed Nt, the target air fuel ratio KMR, an air fuel ratio change flag FlgA and an air fuel ratio change state flag FlgB. In step 1202 the actual engine torque Tereal is calculated using the characteristic of the torque converter, in a manner similar to the description of FIG. 9. Next, in step 1203 it is determined whether FlgA is 1. If it is 1, the change of the air fuel ratio data has been finished, and the operation proceeds to step 1204, carrying out the MBT control. (When FlgA is other than 1, the operation proceeds to RETURN.) In step 1204, the a comparison discontinuation start flag FlgC is set to the value 1, stopping correction by the throttle control (or intake air amount control). Next, processing proceeds to step 1205, where it is determined from FlgB whether the air fuel ratio has moved in the direction of a rich air fuel ratio or a lean air fuel ratio by FlgB. In case of the rich air fuel ratio (FlgB=1) the process advances to step 1206 and in case of the lean air fuel ratio (FlgB=0) proceeds to step 1207. In either case, the MBT is detected, for example, by means of a feedback process comprising steps 1208–1209. That is, in step 1206 (or 1207) the engine timing is incremented by subtracting or adding 1 degree to the crank angle. In step 1208 the actual engine torque Tereal at this time is input with the actual engine torque Tereal(n−1) of the preceding time, and in step 1209, the change of the engine torque caused by changing the ignition timing is determined and fed back. In step 1209, when Tereal is less than or equal to Tereal(n−1), processing advances to step 1210, rewrites the region of the target ignition timing adv to a value of adv+Δ adv, writes 0 to the comparison discontinuation start flag FlgC in step 1211, and proceeds to RETURN. If Tereal is greater than Tereal(n−1) in step 1209, processing returns to step 1205 and steps 1205–1209 are repeated in an iterative process.

FIG. 13 is a flow chart of the ignition timing control by interruption. In step 1301 the operation reads the corrected ignition timing $\Delta$ adv, the air amount Qa and the pulse number count (engine speed) signal Nec. In step 1302, the operation searches the data table of the ignition timing adv and calculates the target ignition timing ADV based on the above-mentioned adv and $\Delta$ adv in step 1303. Further, the operation outputs the target ignition timing ADV in step 1304.

Figure 14:
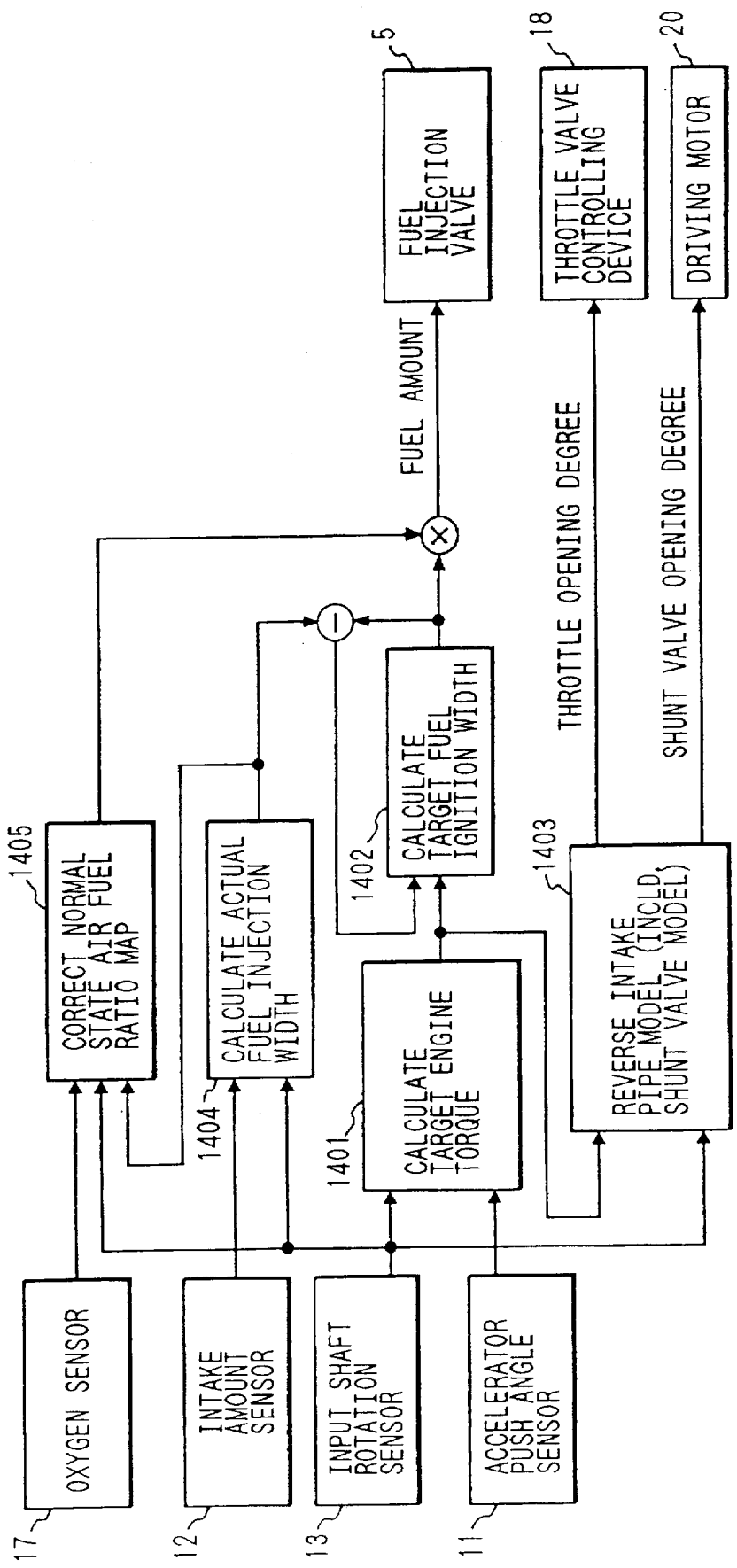
FIG. 14 is a block diagram of a control arrangement for preventing shock caused by a change in an air fuel ratio.
Figure 15:
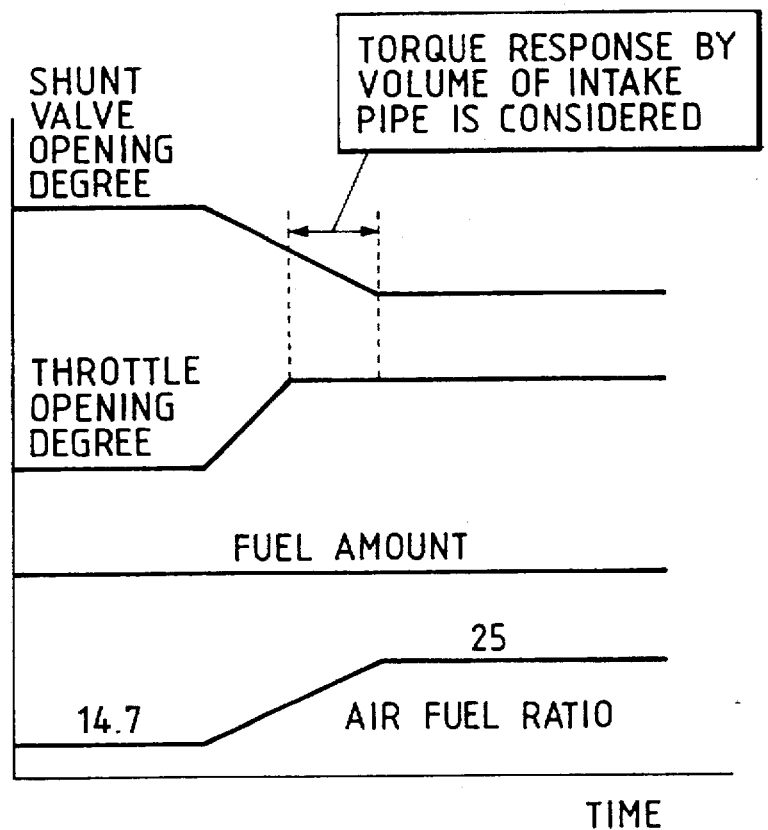
FIG. 15 illustrates time charts for explaining the control of FIG. 14.

FIGS. 14 and 15 show a forth embodiment of the present invention. FIG. 14 is a block diagram which shows an embodiment of a control according to the invention which prevents shock caused by the change of the air fuel ratio. First, the operation inputs the engine speed and the accelerator opening degree to a processing unit 1401, which calculates the target engine torque required by a driver. Next, in block 1402, a target fuel injection pulse width is calculated in conformity with the target engine torque. At the same time the operation also uses a reverse intake pipe model (block 1403) to calculate the air amount (throttle opening degree, opening degree of a shunt valve) in conformity with the target engine torque (that is, in conformity with the target fuel injection width), and outputs it. In this manner, in changing the air fuel ratio, the target engine torque is also set while the accelerator opening stays constant and a fuel injection width is retained, so that the air fuel ratio can be changed without torque variation.

To carry out the fuel amount control with high accuracy, it is necessary to calculate the actual fuel injection width in a processing unit 1404 by feeding back the signals from an air intake amount sensor and the speed sensor to correct the target fuel injection width. Further, in normal (steady state) operation, the process feeds back signals of the oxygen sensor etc. and corrects the air fuel ratio map in a processing unit 1405, thereby correcting the target fuel injection width. This fuel retaining control is suitable in changing the air fuel ratio in both the transient state and steady state.

FIG. 15 illustrates time charts for explaining the control shown in FIG. 14. The relative location of the throttle valve and the shunt valves affects the relationship between the opening of these valves and the engine output torque. Referring to FIG. 1, it is necessary to consider the inertia of the intake air flow in the intake pipe between the throttle control device 18 incorporating the throttle valve and the swirl shunt valves 19. Therefore, there is a time lag between a change in the opening of the throttle valve and the opening of the swirl shunt valves 19, as shown in FIG. 15. The openings of these valves are calculated processing unit 1403 using the reverse intake pipe in model in FIG. 14. When the air fuel ratio is changed while the target engine torque stays constant, the air amount is changed by the control shown in FIG. 15 while maintaining the fuel amount constant. In this manner, the air fuel ratio can be changed without varying the torque.

As shown in the above embodiments, the present invention provides the output torque control method and apparatus for a lean burn internal combustion engine without adverse effect on fuel cost, poisonous exhaust gas emissions and operational performance. Lean burn combustion control can be achieved in conformity with the request of a driver in consideration of aging of component parts of a lean burn internal combustion engine and component parts of the control device.

Figure 16:
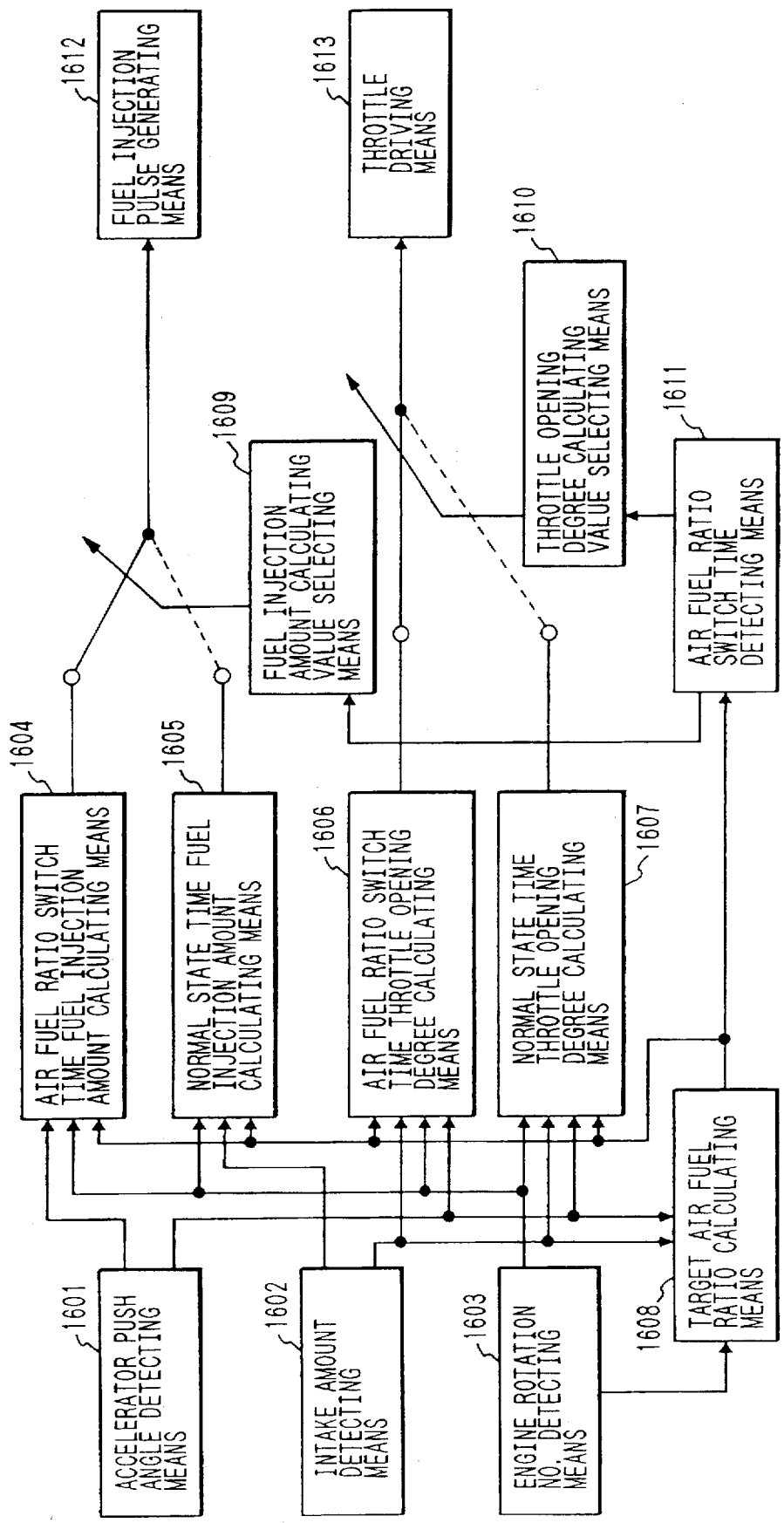
FIG. 16 is a block diagram of a control in another embodiment.

FIGS. 16 through 27 show a fifth embodiment of the present invention. FIG. 16 is a block diagram of a fifth embodiment of the invention, which reduces variation of the output torque of an engine by controlling the air fuel ratio in a switching operation, wherein the air fuel ratio in combustion at a theoretical air fuel ratio is switched to that of lean burn. In FIG. 16, a target air fuel ratio calculating unit 1608 calculates the target air fuel ratio based on the accelerator depression angle detected by an accelerator pedal angle detector 1601, the intake air amount detected by an intake air flow detector 1602 and the engine speed detected by an engine speed detector 1603. An air fuel ratio switch time fuel injection amount calculating unit 1604 calculates the fuel injection amount for switching the air fuel ratio, based on the accelerator depression angle, the engine speed and the target air fuel ratio calculated by the target air fuel ratio calculating unit 1608. A steady state fuel injection amount calculating unit 1605 calculates the fuel injection amount in steady state operation, based on the engine speed, the intake air amount and the target air fuel ratio. An air fuel ratio switch time throttle opening calculating unit 1606 calculates the throttle opening for switching the air fuel ratio, based on the target air fuel ratio from the calculator 1608, the intake air amount detected from detector 1602, the engine speed and the accelerator depression angle. A steady state throttle opening calculator 1607 calculates the throttle opening for steady state operation based on the engine speed, the intake air amount, the accelerator depression angle and the target air fuel ratio from the calculator 1608.

An air fuel ratio switch detecting unit 1611 detects switching of the air fuel ratio, based on the target air fuel ratio from the calculator 1608. A fuel injection value selecting unit 1609 switches from the fuel injection value calculated by the steady state fuel injection value calculating unit 1605 to the value calculated by the air fuel ratio switch fuel injection value calculating unit 1604 during switching of the air fuel ratio (detected by the air fuel ratio switch detecting unit 1611), and switches it back to the value calculated by the steady state fuel injection value calculating unit 1605 when the switching of the air fuel ratio is completed.

A throttle opening value selecting unit 1610 switches from the throttle opening value calculated by the steady state throttle opening calculating unit 1607 to the value calculated by the air fuel ratio switch time throttle opening calculating unit 1606 during switching of the air fuel ratio (detected by the air fuel ratio switch time detecting unit 1611), and switches it back to the value calculated by the steady state throttle opening calculating unit 1607 when switching of the air fuel ratio is completed. A fuel injection pulse generating means 1612 generates pulses based on the fuel injection value selected by the fuel injection value selecting unit 1609. A throttle driving means 1613 drives the throttle based on the calculated value of the throttle opening selected by the throttle opening value selecting unit 1610. Further, in this case, the control of the air amount may be performed not only by the throttle valve but also by valves for idling speed control (hereinafter, ISC) a supercharger, a turbo for controlling a motor etc.

Figure 17:
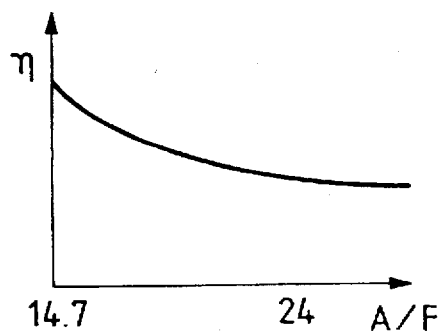
FIG. 17 is a graph showing the relationship between air fuel ratio and fuel amount.
Figure 18:
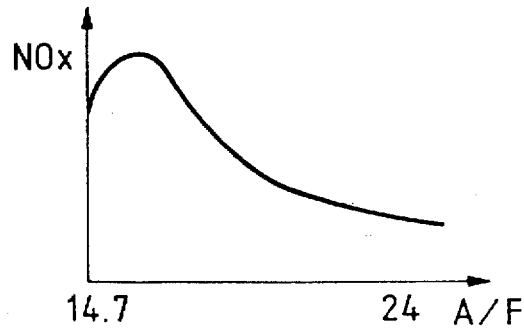
FIG. 18 is a graph showing the relationship between air fuel ratio and NOx emissions.

FIG. 17 shows the relationship between the air fuel ratio A/F and the fuel amount, and FIG. 18 shows a relationship between the air fuel ratio A/F and the emission amount of NOx, both when the output of an engine stays the same. Generally, in a lean burn internal combustion engine, the air fuel ratio is switched by decreasing or increasing the fuel injection amount without changing the opening of the throttle valve (that is, without changing the intake amount). Therefore, in changing the air fuel ratio the output torque of an engine changes, which adversely affects the handling of the vehicle as perceived by a driver or passengers. In this embodiment, to counter this effect, the air fuel ratio is switched by opening and closing the throttle valve to control the air amount, while maintaining the fuel injection amount constant. However, when the air fuel ratio is made lean while generating the same output, the necessary fuel amount is decreased as shown in FIG. 17. Therefore, it is necessary to finely adjust the fuel injection amount to maintain the output torque constant during switching of the air fuel ratio. The NOx generating amount has a peak value in ratio of 14.7 to 21 through 24 as shown in FIG. 18. Therefore, when the switching of the air fuel ratio is performed slowly, the NOx generating amount is increased, which adversely affects exhaust gas purification. Accordingly, the switching of the air fuel ratio must be performed rapidly to decrease the NOx generating amount.

Figure 19:
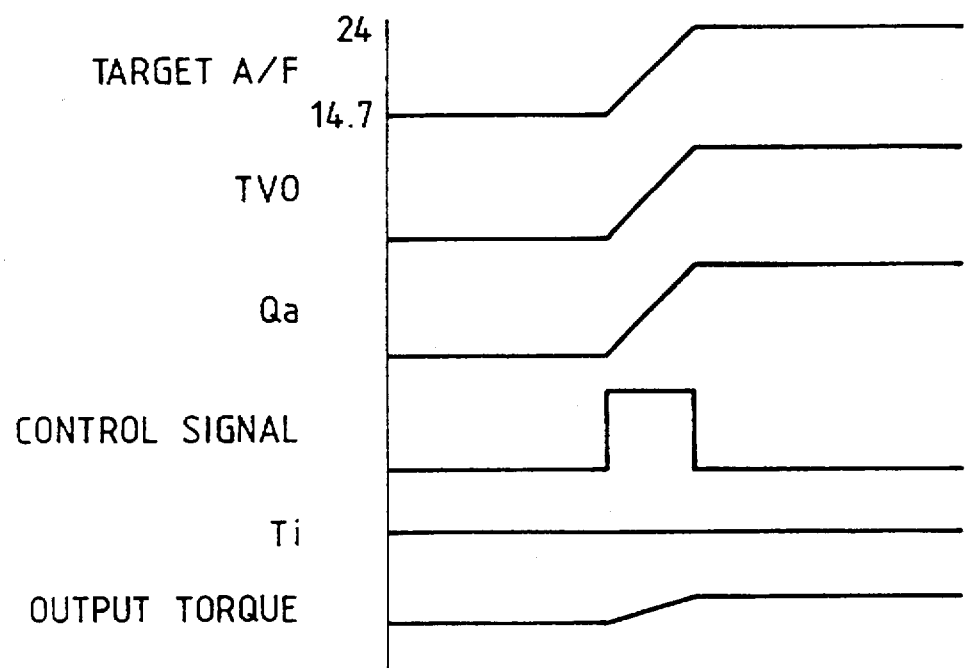
FIG. 19 is a time chart showing the change of output torque of an engine.

FIG. 19 is a time chart which shows the change of the output torque of an engine due to switching the air fuel ratio, when the value of the fuel injection amount Ti is maintained constant. In a transient state, during which the target air fuel ratio is changed from 14.7 to 24, a control signal is outputted by the air fuel ratio switch detecting unit 1611 in FIG. 16, and the method of calculating the fuel injection value Ti and the throttle opening TVO are changed. The throttle opening TVO and the intake air amount Qa change in a manner similar to that of the target air fuel ratio. However, the fuel injection amount Ti is maintained constant. As a result, the output torque is slightly increased due to the lean air fuel ratio. In this manner, rapid change of the output torque due to switching of the air fuel ratio is restrained by maintaining the fuel injection amount Ti constant and changing the intake amount Qa. Thus, the switching of the air fuel ratio can be finished in a short period of time and the generation of NOx can be reduced. However, when the fuel injection amount Ti is maintained constant, a slight variation of the torque occurs. This small variation can be restrained by decreasing the fuel injection amount Ti in accordance with the change of the target air fuel ratio and the increase in the generated torque per fuel amount.

Figure 20:
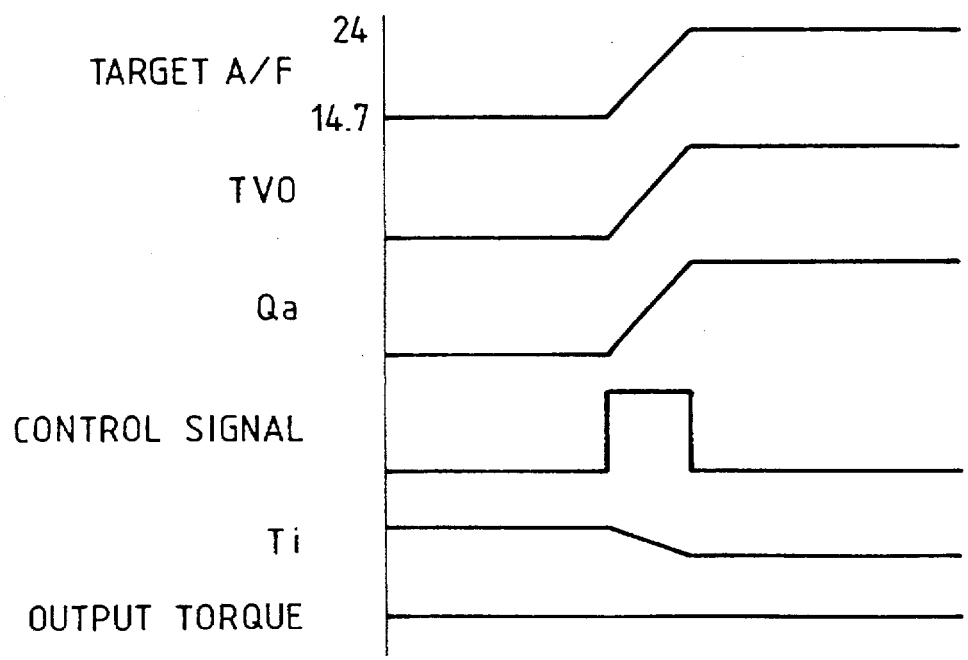
FIG. 20 is a time chart showing another change of output torque of an engine.

FIG. 20 is time chart which shows the change of the output torque due switching the air fuel ratio, when the increase of the output torque is restrained by slightly changing the fuel injection amount. During a transient state in which the target air fuel ratio is changed from 14.7 to 24, a control signal is outputted by the air fuel ratio switch detecting unit 1611 in FIG. 16, whereby methods of calculating the fuel injection value Ti and the throttle opening TVO are switched. The throttle opening TVO and the intake amount Qa change in a manner similar to that of the target air fuel ratio. The fuel injection value Ti is reduced slightly in accordance with an increase in the target air fuel ratio. Accordingly, the small increase in the output torque is restrained and torque shock or adverse handling effects can be prevented, even when the air fuel ratio is changed rapidly.

Figure 21:
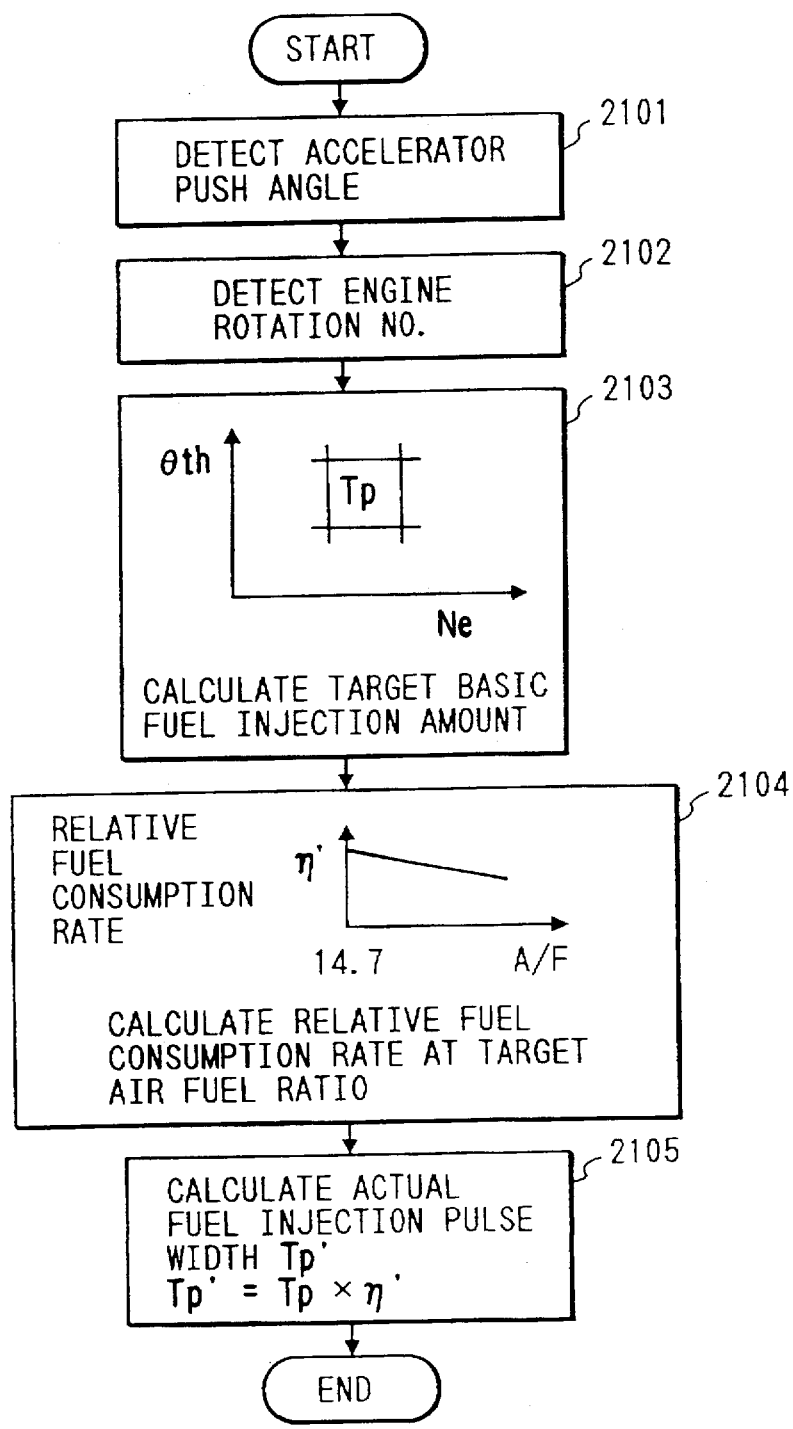
FIG. 21 is a flow chart which shows the calculation performed by an air fuel ratio switch time fuel injection amount calculating means.

FIG. 21 is a flow chart which shows calculation performed by the air fuel ratio switch time fuel injection value calculating unit 1604 shown in FIG. 16. First, in step 2101, the process detects the accelerator depression angle and the engine speed Ne in step 2102. In step 2103 a target basic fuel injection pulse width Tp is determined from a map, based on the engine speed Ne and the accelerator depression angle θth. Next, in step 2104 a map is used to determine a relative fuel consumption rate η' with respect to the target air fuel ratio by setting the fuel consumption rate at the theoretical air fuel ratio of 14.7 as 1. Finally, an actual fuel injection pulse width Tp' is calculated by the following equation (1) in step 2105:

$$Tp'=Tp\times\eta' \tag{1}$$

Figure 22:
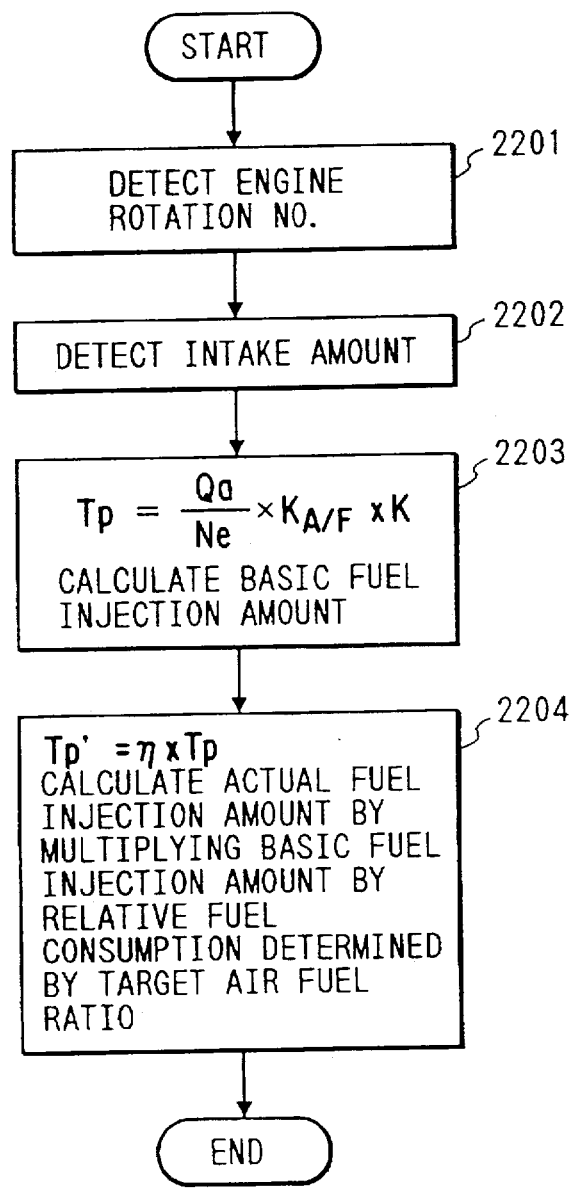
FIG. 22 is a flow chart which shows the calculation performed by a steady state time fuel injection amount calculating means.

FIG. 22 is a flow chart which shows the calculation performed by the steady state fuel injection value calculating unit 1605 shown in FIG. 16. First, the operation detects the engine speed Ne in step 2201 and the intake air amount Qa in step 2202. Next, the basic fuel injection pulse width Tp is calculated by the following equation (2) in step 2203:

$$Tp=Qa/Ne\times K\ A/F\times K \tag{2}$$

where K A/F is a constant determined by air fuel ratio and K is a constant which is independent of the air fuel ratio. Next, in step 2204 the actual fuel injection pulse width Tp' is calculated according to equation (3) below, by multiplying the basic fuel injection pulse width Tp by the relative fuel consumption rate determined by the target air fuel ratio.

$$Tp'=x\ Tp \tag{3}$$

Figure 23:
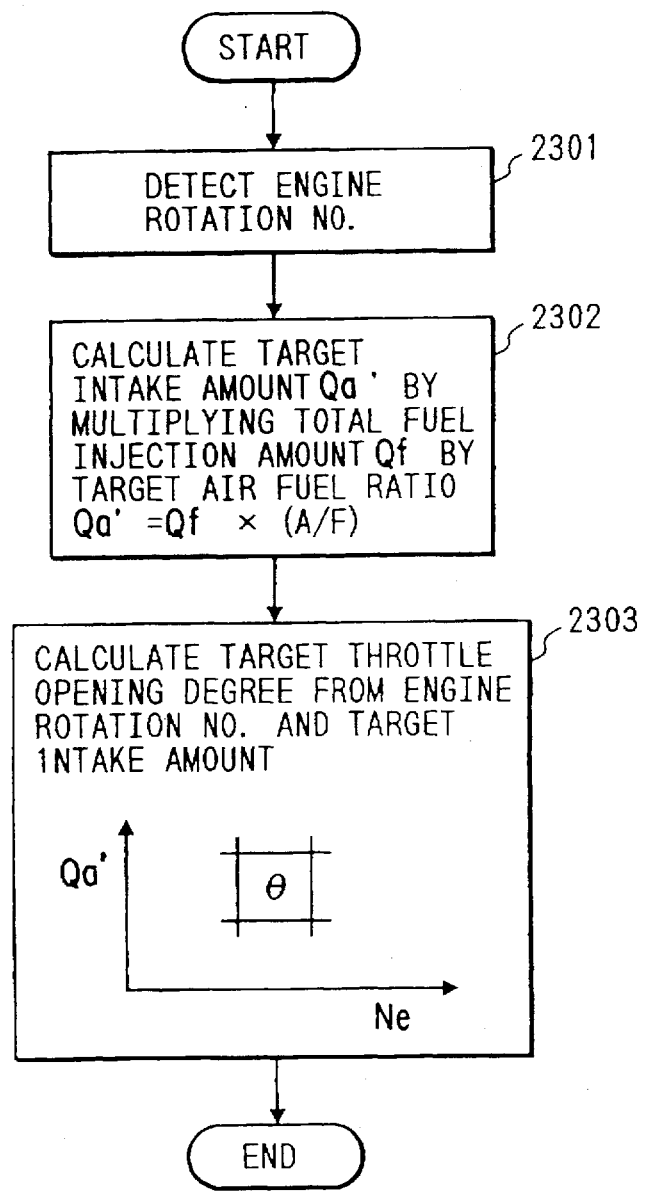
FIG. 23 is a flow chart which shows the calculation performed by an air fuel ratio switch throttle opening degree calculating means.

FIG. 23 shows the calculation performed by the air fuel ratio switch throttle opening calculating unit 1606 in FIG. 16. First, the operation detects the engine speed Ne in step 2301 and calculates the target intake air amount Qa' in step 2303 by the equation (4) below, by multiplying a total fuel injection amount Qf by the target air fuel ratio A/F.

$$Qa'=Qf\times(A/F) \tag{4}$$

Finally, in step 2303 the operation calculates the target throttle opening degree by mapping based on the engine speed Ne and the target intake air amount Qa'.

Figure 24:
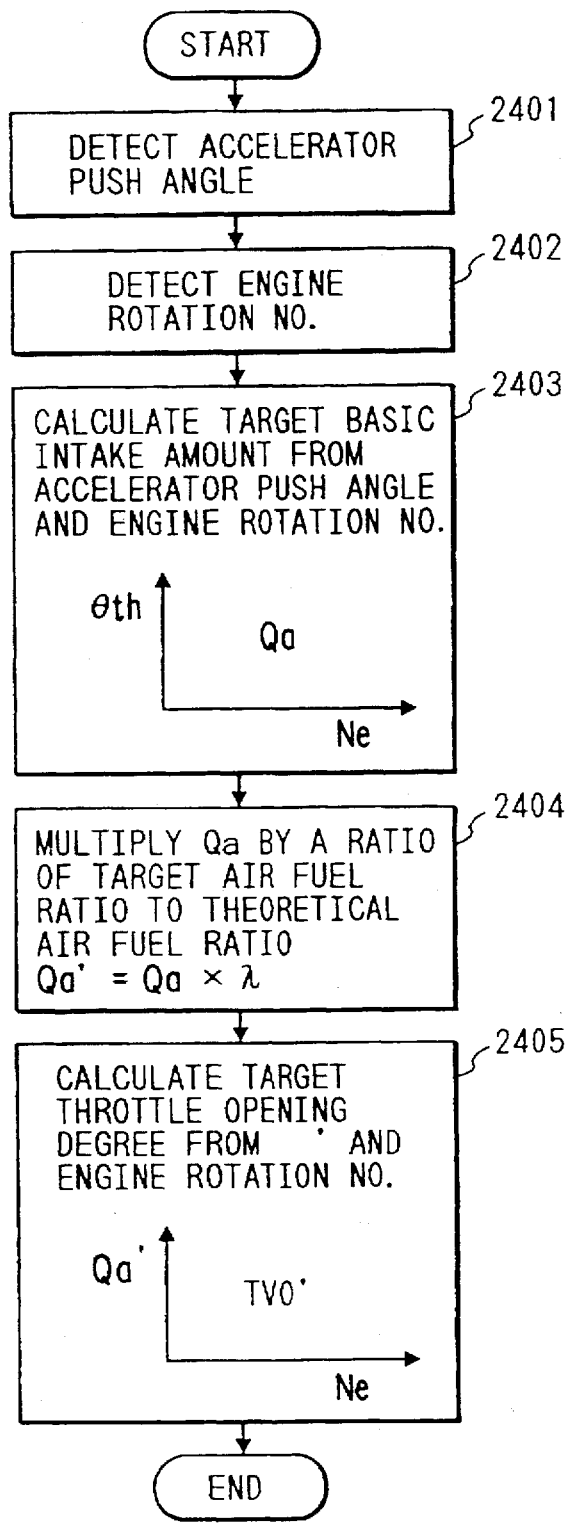
FIG. 24 is a flow chart which shows the calculation performed by a normal state time throttle opening degree calculating means.

FIG. 24 is a flow chart which shows the calculation performed by the steady state time throttle opening calculating unit 1607. First, the accelerator depression angle θth and the engine speed Ne in steps 2401 and 2402. In step 2403, the operation calculates the target basic intake amount Qa by mapping based on the accelerator depression angle θth and the engine speed Ne. Next, in step 2404, a target intake amount Qa' is calculated by multiplying the target basic intake amount Qa by a ratio of the target air fuel ratio to the theoretical air fuel ratio.

$$Qa'=Qa\ x \tag{5}$$

Further, the operation calculates a target throttle opening degree TVO' by mapping from the target intake amount Qa' and the engine speed Ne.

Figure 25:
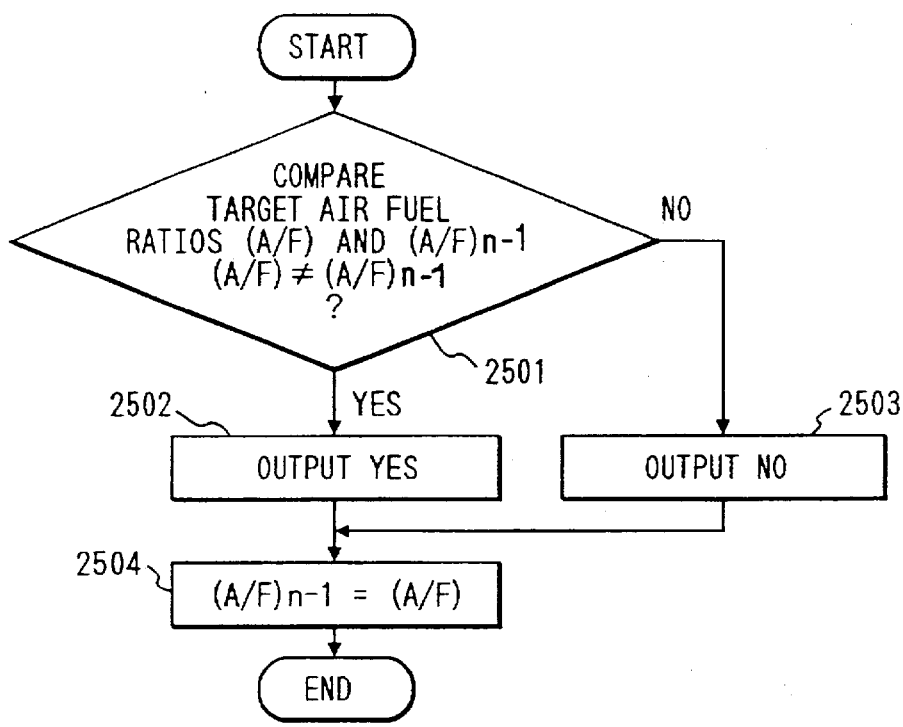
FIG. 25 is a flow chart which shows the calculation performed by an air fuel ratio switch time detecting means.

FIG. 25 is a flow chart which shows the calculation performed by the air fuel ratio switch time detecting unit 1611 shown in FIG. 16. In step 2501, the operation a current target air fuel ratio with a preceding target air fuel ratio, and determines whether the target air fuel ratio has been switched. If so, the operation proceeds to step 2502, and if not, it proceeds to step 2503. In step 2502 the operation outputs Yes, and outputs No in step 2503. Further, in step 2504, the operation is finished when the current target air fuel ratio is equal to the preceding target air fuel ratio.

Figure 26:
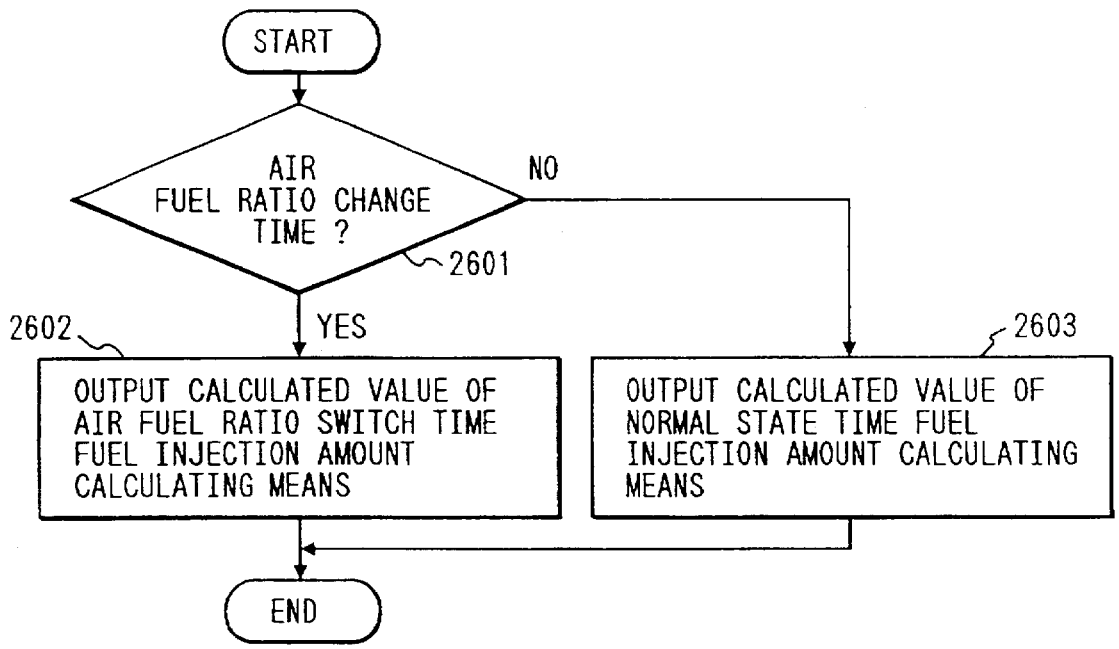
FIG. 26 is a flow chart which shows the calculation performed by a fuel injection amount calculation value selecting means.

FIG. 26 shows the calculation performed by the fuel injection value selecting unit 1609 in FIG. 16. In step 2601, the operation checks whether the air fuel ratio is to be switched. If so, processing advances to step 2602, and to step 2603 if not. In step 2602, the operation outputs the calculated value of the air fuel ratio switch time fuel injection value calculating unit 1604. In step 2603, the operation outputs the calculated value of the steady state fuel injection amount calculating unit 1605.

Figure 27:
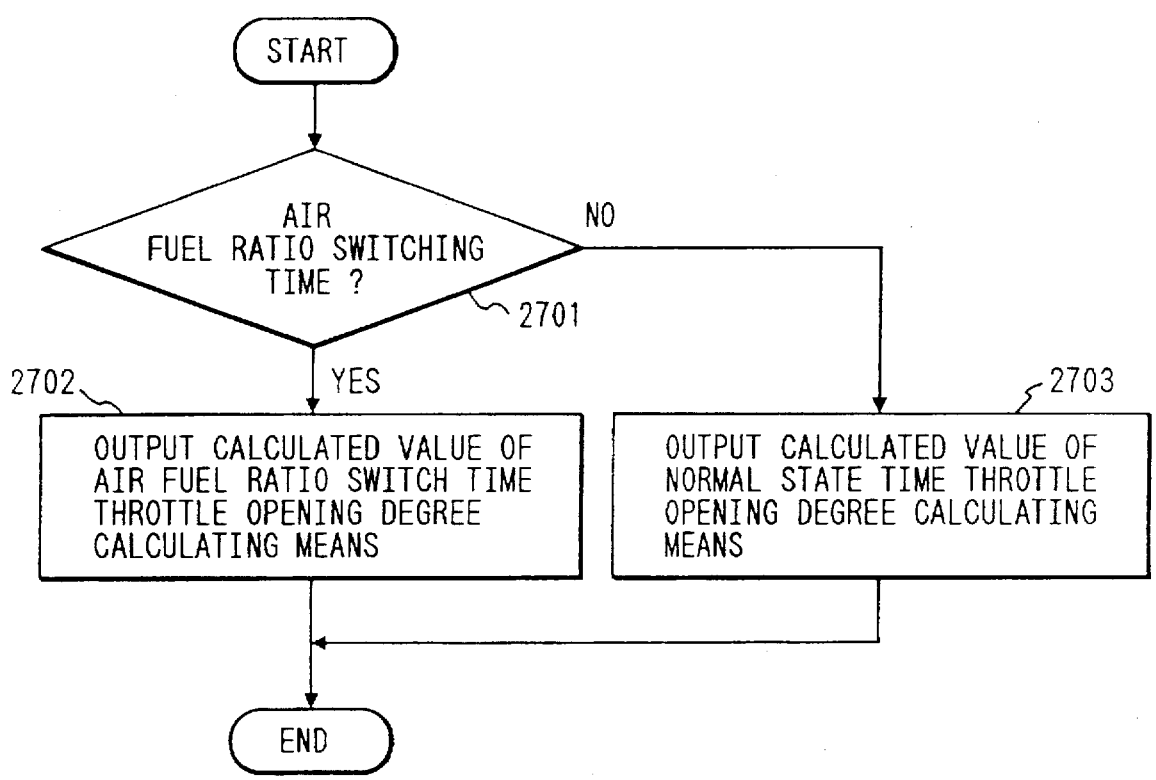
FIG. 27 is a flow chart which shows the calculation performed by a throttle opening degree calculation value selecting means.

FIG. 27 shows the calculation performed by the throttle opening value selecting unit 1610 in FIG. 16. In step 2701, the operation checks whether the air fuel ratio is to be switched. If so, the operation proceeds to step 2702, and proceeds to step 2703 if not. In step 2702, the operation outputs the calculated value of the air fuel ratio switch time throttle opening calculating unit 1606, while in step 2703, the operation outputs the calculated value of the steady state throttle opening calculating unit 1607.

As stated above, according to the present invention, stepwise change of torque or shock in switching the air fuel ratio is restrained to the greatest extent possible, the air fuel ratio can be switched rapidly and the emission amount of NOx can be reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An output torque control apparatus for an internal combustion engine, comprising:

a first control valve for controlling an amount of intake air which is sucked into cylinders of the engine;

a first actuator for controlling operation of said first control valve;

a second control valve for controlling a flow of said intake air;

a second actuator for controlling said second control valve;

a control unit for delivering signals which indicate control amounts for controlling said first and second actuation; and a correction device for correcting said control signals based on a difference between an air volume from said first control valve to an inlet of said cylinders and an air volume from said second control valve to said inlet of said cylinders.

2. An output torque control apparatus according to claim 1, wherein said correction device generates signals indicative of a change in an opening of said second control valve greater than a change in an opening of said first control valve.

3. An output torque control apparatus according to claim 1, wherein said correction device determines said signals based on a reverse intake pipe model.

4. An output torque control apparatus according to claim 1, wherein said correction device generates a signal indicative of a change of an opening of at least one of said first and second control valves.

5. A method of controlling output torque of an internal combustion engine comprising:

controlling an amount of intake air sucked into cylinders of said engine by means of a first control valve;

controlling a flow of said intake air by means of a second control valve;

detecting air volumes flowing from said first and second control valves respectively to an inlet of said cylinders;

correcting openings of said first and second control valves based on a difference between said air volumes.

6. Method according to claim 5, wherein said correcting step is performed in response to a change of an opening of said second control valve which is greater than a change of air opening of said first control valve.

7. Method according to claim 5, wherein said correction is determined based on a reverse intake pipe model.

8. Method according to claim 5, wherein said correction is based on a change in an opening of at least one of said first and second control valves.

* * * * *